US012784045B2

(12) United States Patent
Singh

(10) Patent No.: US 12,784,045 B2
(45) Date of Patent: Nov. 3, 2026

(54) ZERO TRUST ENABLE INTELLIGENT APPARATUS TO REGISTER IoT DEVICES FOR PAYMENT LEVERAGING NON FUNGIBLE

(71) Applicant: Bank of America Corporation, Charlotte, NC (US)

(72) Inventor: Shailendra Singh, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 19/229,660

(22) Filed: Jun. 5, 2025

(65) Prior Publication Data

US 2025/0299191 A1 Sep. 25, 2025

Related U.S. Application Data

(62) Division of application No. 18/121,514, filed on Mar. 14, 2023, now Pat. No. 12,361,416.

(51) Int. Cl.
*G06Q 20/40* (2012.01)
*G06Q 20/38* (2012.01)

(52) U.S. Cl.
CPC ......... *G06Q 20/401* (2013.01); *G06Q 20/389* (2013.01)

(58) Field of Classification Search
None
See application file for complete search history.

(56) References Cited

U.S. PATENT DOCUMENTS 10,673,617 B1 6/2020 Antoniou et al.
11,012,228 B2 5/2021 Mercuri et al.
11,075,891 B1 7/2021 Long et al.
11,528,611 B2 12/2022 Smith et al.
12,014,352 B1 * 6/2024 Gupta .................. G06Q 20/409
(Continued)

FOREIGN PATENT DOCUMENTS

CN 107171805 B 4/2020
CN 107749848 B 4/2020
(Continued)

OTHER PUBLICATIONS

Khalil, et al., in "DSCOT: An NFT-Based Blockchain Architecture for the Authentication of IoT-Based SMA" from Computer Science, at https://arxiv.org/2211/04803 year: 2022 (Year: 2022).
IEEE, Why the Future Internet of Things Depends on Blockchain, at <https://innovationatwork.ieee.org/why-the-future-internet-of-things-depends-on-blockchain/>, 8 pages.
(Continued)

*Primary Examiner* — Paul S Schwarzenberg
(74) *Attorney, Agent, or Firm* — Banner & Witcoff, Ltd.

(57) ABSTRACT

Systems and methods are disclosed for validating transactions executed by Internet of Things (IoT) devices leveraging non fungible tokens (NFTs) stored on a blockchain. The system generates a first NFT paired with metadata associated with an IoT device, a second NFT paired with metadata associated with a transaction requested by the IoT device, and a third NFT merging the first and second NFTs together. The NFTs are used in validation processes to ensure an IoT device and/or a transaction requested by an IoT device are valid. The NFTs are bound to smart contracts assigned one or more rules related to validating an IoT device and/or transaction requested by an IoT device. A transaction requested by an IoT device executes based on the validation processes.

20 Claims, 10 Drawing Sheets

(56) References Cited

U.S. PATENT DOCUMENTS

| | | | | |
|---|---|---|---|---|
| 2015/0379510 | A1 | 12/2015 | Smith | |
| 2021/0150626 | A1* | 5/2021 | Robotham | H04L 9/50 |
| 2021/0160233 | A1* | 5/2021 | Biyani | H04L 9/3236 |
| 2021/0256070 | A1 | 8/2021 | Tran et al. | |
| 2022/0069996 | A1 | 3/2022 | Xue et al. | |
| 2022/0261882 | A1 | 8/2022 | Youb et al. | |
| 2022/0366061 | A1* | 11/2022 | Spivack | H04L 9/3271 |
| 2023/0231713 | A1* | 7/2023 | Seo | H04L 9/321<br>713/155 |
| 2023/0298008 | A1 | 9/2023 | Sarin | |
| 2024/0020682 | A1* | 1/2024 | Castagna | G06Q 20/3674 |
| 2024/0020692 | A1* | 1/2024 | Castagna | G06Q 20/36 |
| 2024/0127211 | A1 | 4/2024 | Newton | |
| 2024/0181987 | A1* | 6/2024 | Stefanovski | G07C 9/00309 |
| 2024/0185180 | A1* | 6/2024 | Mohammed | G06Q 40/08 |
| 2024/0185223 | A1* | 6/2024 | McGarity | H04L 9/3239 |
| 2024/0185229 | A1* | 6/2024 | Dashkov | G06Q 30/0207 |
| 2024/0202725 | A1 | 6/2024 | Anapliotis et al. | |
| 2024/0273115 | A1 | 8/2024 | Huang et al. | |

FOREIGN PATENT DOCUMENTS

| | | | |
|---|---|---|---|
| CN | 108306887 | B | 7/2020 |
| EP | 3257191 | B1 | 4/2018 |
| JP | 6950908 | B2 | 10/2021 |
| KR | 102294571 | B1 | 8/2021 |
| WO | 2022182674 | A1 | 9/2022 |

OTHER PUBLICATIONS

Manufacturing Business Technology, The Future of the Internet of Things with Blockchain, dated Mar. 24, 2021, at https://www.mbtmag.com/best-practices/article/21342740/the-future-of-the-internet-of-things-with-blockchain, 17 pages.

Wikipedia, IOTA (technology), at https://en.wikipedia.org/wiki/IOTA_(technology), 10 pages.

Tiago M. Fernandez-Carames & Paula Fraga-Lamas, A Review on the Use of Blockchain for the Internet of Things, IEEE Access, vol. 6, dated Jul. 6, 2018, at https://ieeexplore.ieee.org/stamp/stamp.jsp?arnumber=8370027, 23 pages.

* cited by examiner

ZERO TRUST ENABLE INTELLIGENT APPARATUS TO REGISTER IoT DEVICES FOR PAYMENT LEVERAGING NON FUNGIBLE

RELATED APPLICATION DATA

This application is a divisional of U.S. patent application Ser. No. 18/121,514, filed on Mar. 14, 2023, which is hereby incorporated by reference in its entirety.

TECHNICAL FIELD

Aspects of the disclosure relate to blockchain management, and more specifically, to use of non fungible tokens (NFTs) on a blockchain system for improved security involving Internet of Things (IoT) devices.

BACKGROUND

Existing methods and systems involve the use of IoT devices. There are potential security risks in allowing IoT devices to interact with a system. There are problems with remediating the risk of unauthorized IoT devices interacting with a system.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure provide effective, efficient, scalable, and convenient technical solutions that address various security issues associated with IoT devices used in payment systems. One or more of the aspects herein relate to the use of blockchains to provide security solutions to IoT device and payment transaction problems. Additional aspects herein relate to the integration of machine learning-based techniques into security solutions associated with IoT device and payment transaction problems.

These and additional aspects will be appreciated with the benefit of the disclosures discussed in further detail below.

In one embodiment, systems and methods leverage NFTs to validate an IoT device executing a payment transaction on a payment platform. The system mines metadata associated with the IoT device when the IoT device initiates registration on the payment platform. The system generates a first NFT paired with the metadata associated with the IoT device that is stored on a blockchain for validation purposes. The first NFT is managed by a smart contract which defines one or more rules for validating the IoT device on the payment platform based on the first NFT paired with the metadata associated with the IoT device.

In some embodiments, a NFT based mechanism is provided to validate ownership of an IoT device executing a payment transaction, inter alia, to ensure tamper proof payment transactions on a payment system by an IoT device.

In some embodiments, converting an IoT device, a payment transaction and their associated metadata into NFTs, which are managed by smart contract, is a multi-step process, as elaborated upon herein.

In another embodiment, systems and methods leverage NFTs to validate a payment transaction executed by an IoT device on a payment platform. The system mines metadata associated with the payment transaction when the IoT device executes a payment transaction on the payment platform. The system generates a second NFT paired with the metadata associated with the payment transaction that is stored on a blockchain for validation purposes. The second NFT is managed by a smart contract which defines one or more rules for validating the payment transaction on the payment platform based on the second NFT paired with the metadata associated with the payment transaction.

In another embodiment, systems and methods leverage NFTs to validate both an IoT device and a payment transaction executed by the IoT device on a payment platform. The system generates a third NFT merging the first NFT paired with the metadata associated with the IoT device and the second NFT paired with the metadata associated with the payment transaction. The third NFT is managed by a smart contract which defines one or more rules for validating both the IoT device the payment transaction in order to execute a payment transaction on a payment platform. Using the third NFT for validation provides the most security in executing payment transactions due to validation of both the IoT device and payment transaction in order to execute a payment transaction.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
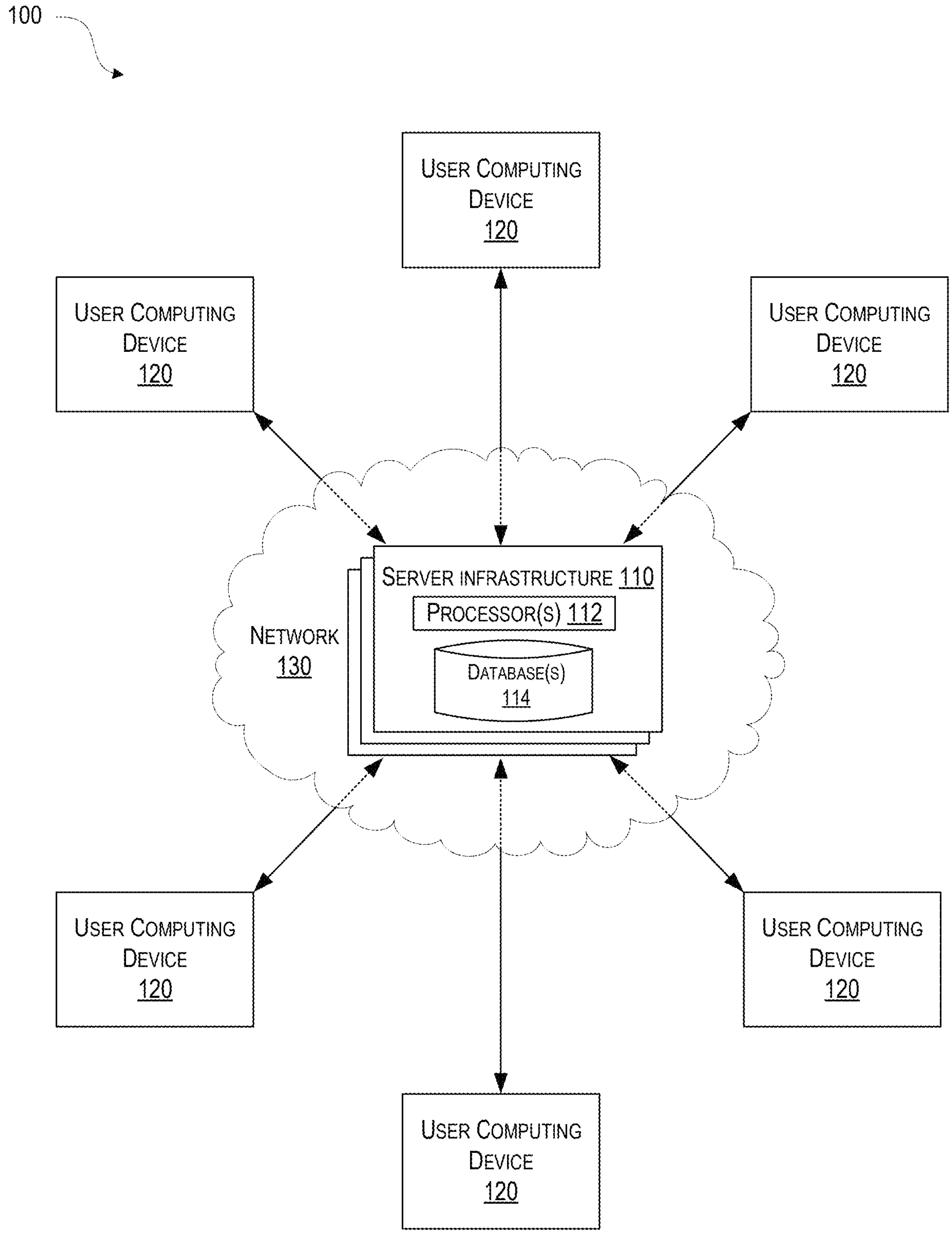
FIG. 1 depicts an illustrative example of centralized computer system in accordance with one or more illustrative aspects described herein.

Various enterprise institutions incorporate the use of Internet of Things (IoT) technology for payment systems or similar systems and platforms. IoT devices are used to autonomously and semi-autonomously execute transactions based on pre-defined rules and logic. A payment system or platform needs to know if an IoT device attempting to execute a transaction is authorized or potentially malicious.

There is a need for a method involving a secure zero trust mechanism in payment systems integrating IoT technology and devices. Payment systems need to ensure ownership of IoT devices every time a request for a transaction is made. Additionally, every transaction by the IoT device needs to be validated before the transaction is executed by the payment system.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways. It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

As a general introduction to the subject matter described in more detail below, aspects described herein are directed towards the methods and systems disclosed herein.

The disclosure provided herein is described, at least in part, in relation to a decentralized peer-to-peer (e.g., P2P) system specialized for the purpose of managing a blockchain. The decentralized P2P system may be comprised of computing devices that are distributed in multiple locations across a geographical area as opposed to a single location. The computing devices forming the decentralized P2P system may operate with each other to manage a blockchain, which may be a data structure used to store information related to the decentralized P2P system. More specifically, the blockchain may be a chronological linkage of data elements (e.g., blocks) which store data records relating to the decentralized computing system.

A user may access the decentralized P2P system through a specialized "wallet" that serves to uniquely identify the user and enable the user to perform functions related to the decentralized P2P network. Through the wallet, the user may be able to hold tokens, funds, and/or any other asset associated with the decentralized P2P system. Furthermore, the user may be able to use the wallet to request performance of network-specific functions related to the decentralized P2P system such as fund, token, and/or asset transfers. The various computing devices forming the decentralized P2P computing system may operate as a team to perform network-specific functions requested by the user. In performing the network-specific functions, the various computing devices may produce blocks that store the data generated during the performance of the network-specific functions and may add the blocks to the blockchain. After the block has been added to the blockchain, the wallet associated with the user may indicate that the requested network-specific function has been performed.

For example, a user may have a wallet which reflects that the user has five tokens associated with the decentralized P2P system. The user may provide a request to the decentralized P2P system to transfer the five tokens to a friend who also has a wallet. The various computing devices forming the decentralized P2P computing system may perform the request and transfer the five tokens from the wallet of the user to the wallet of the friend. In doing so, a block may be created by the various computing devices of the decentralized P2P computing system. The block may store data indicating that the five tokens were transferred from the wallet of the user to the wallet of the friend. The various computing devices may add the block to the blockchain. At such a point, the wallet of the user may reflect the transfer of the five tokens to the wallet of the friend, and may indicate a balance of zero. The wallet of the friend, however, may also reflect the transfer of the five tokens and may have a balance of five tokens.

In more detail, the decentralized P2P system may be specialized for the purpose of managing a distributed ledger, such as a private blockchain or a public blockchain, through the implementation of digital cryptographic hash functions, consensus algorithms, digital signature information, and network-specific protocols and commands. The decentralized P2P system (e.g., decentralized system) may be comprised of decentralized system infrastructure consisting of a plurality computing devices, either of a heterogeneous or homogenous type, which serve as network nodes (e.g., full nodes and/or lightweight nodes) to create and sustain a decentralized P2P network (e.g., decentralized network). Each of the full network nodes may have a complete replica or copy of a blockchain stored in memory and may operate in concert, based on the digital cryptographic hash functions, consensus algorithms, digital signature information, and network-specific protocols, to execute network functions and/or maintain inter-nodal agreement as to the state of the blockchain. Each of the lightweight network nodes may have at least a partial replica or copy of the blockchain stored in memory and may request performance of network functions through the usage of digital signature information, hash functions, and network commands. In executing network functions of the decentralized network, such as balance sheet transactions and smart contract operations, at least a portion of the full nodes forming the decentralized network may execute the one or more cryptographic hash functions, consensus algorithms, and network-specific protocols to register a requested network function on the blockchain. In some instances, a plurality of network function requests may be broadcasted across at least a portion of the full nodes of the decentralized network and aggregated through execution of the one or more digital cryptographic hash functions and by performance of the one or more consensus algorithms to generate a single work unit (e.g., block), which may be added in a time-based, chronological manner to the blockchain through performance of network-specific protocols.

While in practice the term "blockchain" may hold a variety of contextually derived meanings, the term blockchain, as used herein, refers to a concatenation of sequentially dependent data elements (e.g., blocks) acting as a data ledger that stores records relating to a decentralized computing system. Such data records may be related to those used by a particular entity or enterprise, such as a financial institution, and/or may be associated with a particular application and/or use case including, but not limited to, cryptocurrency, digital content storage and delivery, entity authentication and authorization, digital identity, marketplace creation and operation, internet of things (e.g., IoT), prediction platforms, election records, currency exchange and remittance, P2P transfers, ride sharing, trading platforms, and real estate, precious metal, and work of art registration and transference, among others. A "private blockchain" may refer to a blockchain of a decentralized private system in which only authorized computing devices are permitted to act as nodes in a decentralized private network and have access to the private blockchain. In some instances, the private blockchain may be viewable and/or accessible by authorized computing devices which are not participating as nodes within the decentralized private network, but still have proper credentials. A "public blockchain" may refer to a blockchain of a decentralized public system in which any computing devices may be permitted to act as nodes in a decentralized public network and have access to the public blockchain. In some instances, the public blockchain may be viewable and/or accessible by computing devices which are not participating as nodes within the decentralized public network.

Further, a "full node" or "full node computing device," as used herein, may describe a computing device in a decentralized system which operates to create and maintain a decentralized network, execute requested network functions, and maintain inter-nodal agreement as to the state of the blockchain. In order to perform such responsibilities, a computing device operating as a full node in the decentralized system may have a complete replica or copy of the blockchain stored in memory, as well as executable instructions for the execution of hash functions, consensus algorithms, digital signature information, network protocols, and network commands. A "lightweight node," "light node," "lightweight node computing device," or "light node computing device" may refer to a computing device in a decentralized system, which operates to request performance of network functions (e.g., balance sheet transactions, smart contract operations, and the like) within a decentralized network but without the capacity to execute requested network functions and maintain inter-nodal agreement as to the state of the blockchain. As such, a computing device operating as a lightweight node in the decentralized system may have a partial replica or copy of the blockchain. In some instances, network functions requested by lightweight nodes to be performed by the decentralized network may also be able to be requested by full nodes in the decentralized system.

"Network functions" and/or "network-specific functions," as described herein, may relate to functions which are able to be performed by nodes of a decentralized P2P network. In some arrangements, the data generated in performing network-specific functions may or may not be stored on a blockchain associated with the decentralized P2P network. Examples of network functions may include "smart contract operations." A smart contract operation, as used herein, may describe one or more operations performed by a "smart contract," which may be one or more algorithms and/or programs associated with one or more nodes within a decentralized P2P network. For example, the one or more algorithms and/or programs may correspond to addition of a NFT to a blockchain or querying of NFTs stored in a blockchain. Addition of NFTs may correspond to updating those stored in the blockchain.

In one or more aspects of the disclosure, a "digital cryptographic hash function," as used herein, may refer to any function which takes an input string of characters (e.g., message), either of a fixed length or non-fixed length, and returns an output string of characters (e.g., hash, hash value, message digest, digital fingerprint, digest, and/or checksum) of a fixed length. Examples of digital cryptographic hash functions may include BLAKE (e.g., BLAKE-256, BLAKE-512, and the like), MD (e.g., MD2, MD4, MD5, and the like), Scrypt, SHA (e.g., SHA-1, SHA-256, SHA-512, and the like), Skein, Spectral Hash, SWIFT, Tiger, and so on. A "consensus algorithm," as used herein and as described in further detail below, may refer to one or more algorithms for achieving agreement on one or more data values among nodes in a decentralized network. Examples of consensus algorithms may include proof of work (e.g., PoW), proof of stake (e.g., PoS), delegated proof of stake (e.g., DPoS), practical byzantine fault tolerance algorithm (e.g., PBFT), and so on. Furthermore, "digital signature information" may refer to one or more private/public key pairs and digital signature algorithms which are used to digitally sign a message and/or network function request for the purposes of identity and/or authenticity verification. Examples of digital signature algorithms which use private/public key pairs contemplated herein may include public key infrastructure (PKI), Rivest-Shamir-Adleman signature schemes (e.g., RSA), digital signature algorithm (e.g., DSA), Edwards-curve digital signature algorithm, and the like. A "wallet," as used herein, may refer to one or more data and/or software elements (e.g., digital cryptographic hash functions, digital signature information, and network-specific commands) that allow a node in a decentralized P2P network to interact with the decentralized P2P network. A wallet may be associated with a public key, which may serve to identify the wallet. In requesting performance of network operations, a private key associated with the wallet may be used to digitally sign the network operation requests.

As will be described in further detail below, a decentralized P2P system implementing a blockchain data structure may provide solutions to technological problems existing in current centralized system constructs with traditional data storage arrangements. For example, conventional data storage arrangements that use a central data authority have a single point of failure (namely, the central storage location) which, if compromised by a malicious attacker, can lead to data tampering, unauthorized data disclosure, and/or loss of operative control of the processes performed by the centralized system. The implementation of a blockchain data structure in a decentralized P2P system acts as a safeguard against unreliable and/or malicious nodes acting in the decentralized P2P network to undermine the work efforts of the other nodes, e.g., by providing byzantine fault tolerance within the network.

FIG. 1 depicts an illustrative example of centralized computer system 100 in accordance with one or more illustrative aspects described herein. Centralized computer system 100 may comprise one or more computing devices including at least server infrastructure 110 and user computing devices 120. Each of user computing devices 120 may be configured to communicate with server infrastructure 110 through network 130. In some arrangements, centralized computer system 100 may include additional computing devices and networks that are not depicted in FIG. 1, which also may be configured to interact with server infrastructure 110 and, in some instances, user computing devices 120.

Server infrastructure 110 may be associated with a distinct entity such as a company, school, government, and the like, and may comprise one or more personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), and the like. Server infrastructure 110 may include computing hardware and software that may host various data and applications for performing tasks of the centralized entity and for interacting with user computing devices 120, as well as other computing devices. For example, each of the computing devices comprising server infrastructure 110 may include at least one or more processors 112 and one or more databases 114, which may be stored in memory of the one or more computing devices of server infrastructure 110. Through execution of computer-readable instructions stored in memory, the computing devices of server infrastructure 110 may be configured to perform functions of the centralized entity and store the data generated during the performance of such functions in databases 114.

In some arrangements, server infrastructure 110 may include and/or be part of enterprise information technology infrastructure and may host a plurality of enterprise applications, enterprise databases, and/or other enterprise resources. Such applications may be executed on one or more computing devices included in server infrastructure 110 using distributed computing technology and/or the like. In some instances, server infrastructure 110 may include a relatively large number of servers that may support operations of a particular enterprise or organization, such as a financial institution. Server infrastructure 110, in this embodiment, may generate a single centralized ledger for data received from the various user computing devices 120, which may be stored in databases 114.

Each of the user computing devices 120 may be configured to interact with server infrastructure 110 through network 130. In some instances, one or more of the user computing devices 120 may be configured to receive and transmit information corresponding to system requests through particular channels and/or representations of webpages and/or applications associated with server infrastructure 110. The system requests provided by user computing devices 120 may initiate the performance of particular computational functions such as data and/or file transfers at server infrastructure 110. In such instances, the one or more of the user computing devices may be internal computing devices associated with the particular entity corresponding to server infrastructure 110 and/or may be external computing devices which are not associated with the particular entity.

As stated above, centralized computer system 100 also may include one or more networks, which may interconnect one or more of server infrastructure 110 and one or more user computing devices 120. For example, centralized computer system 100 may include network 130. Network 130 may include one or more sub-networks (e.g., local area networks (LANs), wide area networks (WANs), or the like). Furthermore, centralized computer system 100 may include a local network configured to interlink each of the computing devices comprising server infrastructure 110.

Furthermore, in some embodiments, centralized computer system 100 may include a plurality of computer systems arranged in an operative networked communication arrangement with one another through a network, which may interface with server infrastructure 110, user computing devices 120, and network 130. The network may be a system specific distributive network receiving and distributing specific network feeds and identifying specific network associated triggers. The network may also be a global area network (GAN), such as the Internet, a wide area network (WAN), a local area network (LAN), or any other type of network or combination of networks. The network may provide for wireline, wireless, or a combination wireline and wireless communication between devices on the network.

In the centralized computer system 100 described in regard to FIG. 1, server infrastructure 110 may serve as a central authority which manages at least a portion of the computing data and actions performed in relation to the particular entity associated with server infrastructure 110. As such, server infrastructure 110 of centralized computer system 100 provides a single point of failure which, if compromised by a malicious attacker, can lead to data tampering, unauthorized data disclosure, and/or loss of operative control of the processes performed by the server infrastructure 110 in relation to the particular entity associated with server infrastructure 110. In such a centralized construct in which a single point of failure (e.g., server infrastructure 110) is created, significant technological problems arise regarding maintenance of operation and data control, as well as preservation of data integrity. As will be described in further detail below in regard to FIG. 2, such technological problems existing in centralized computing arrangements may be solved by a decentralized P2P system implementing a blockchain data structure, even wholly within the server infrastructure 110.

Figure 2:
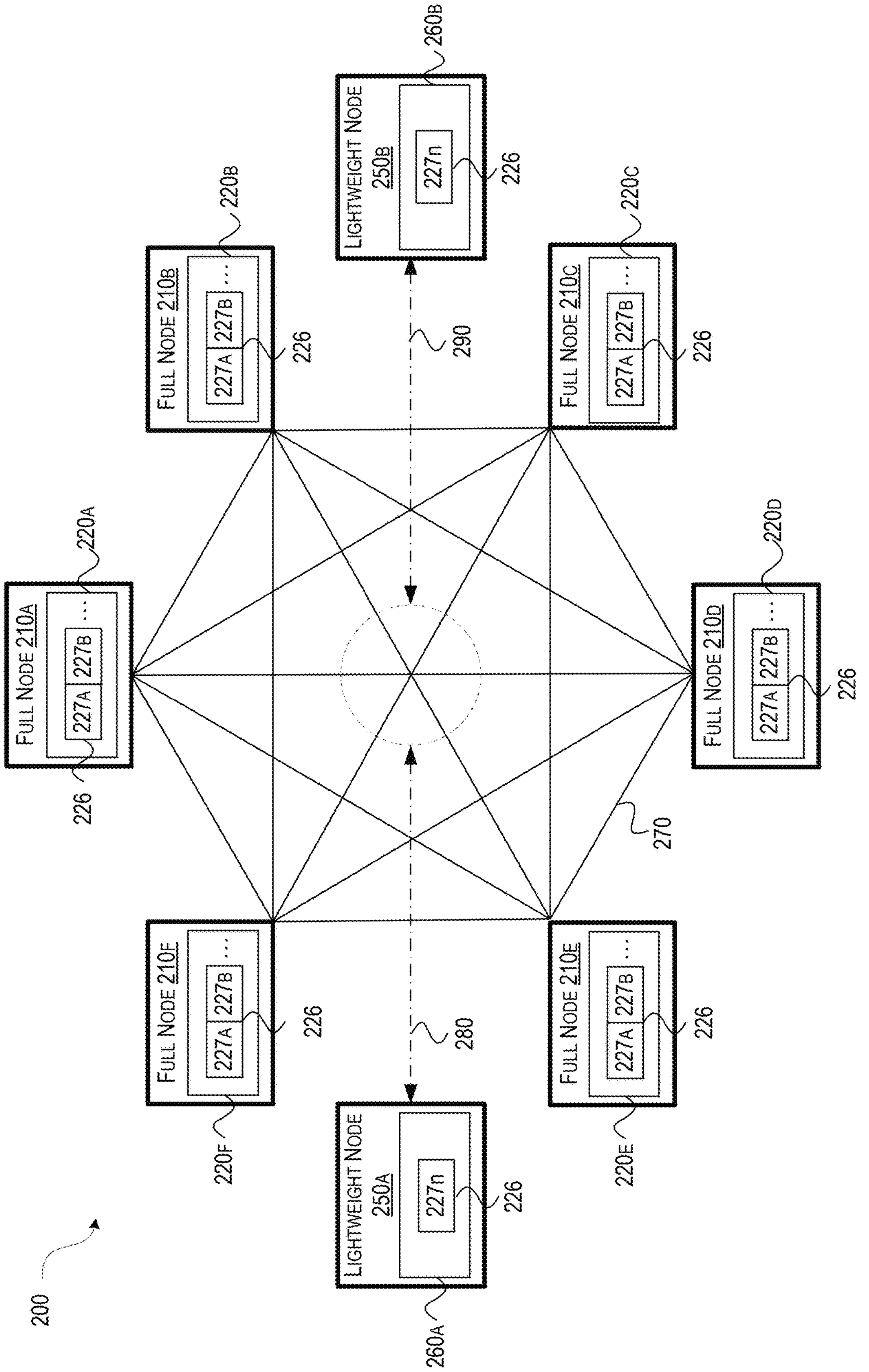
FIG. 2 depicts an illustrative example of decentralized peer-to-peer (P2P) computer system that may be used in accordance with one or more illustrative aspects described herein.

FIG. 2 depicts an illustrative example of decentralized P2P computer system 200 that may be used in accordance with one or more illustrative aspects described herein. Decentralized P2P computer system 200 may include a plurality of full node computing devices 210A, 210B, 210C, 210D, 210E, and 210F and lightweight node computing devices 250A and 250B, which may be respectively similar to full node computing device 210 described in regard to FIG. 3A and lightweight node computing device 250 described in regard to FIG. 3B. While a particular number of full node computing devices and lightweight node computing devices are depicted in FIG. 2, it should be understood that a number of full node computing devices and/or lightweight node computing devices greater or less than that of the depicted full node computing devices and lightweight node computing devices may be included in decentralized P2P computer system 200. Accordingly, any additional full node computing devices and/or lightweight node computing devices may respectively perform in the manner described below in regard to full node computing devices 210A-210F and lightweight node computing devices 250A and 250B in decentralized P2P computer system 200.

Each of full node computing devices 210A-210F may operate in concert to create and maintain decentralized P2P network 270 of decentralized P2P computer system 200. In creating decentralized P2P network 270 of decentralized P2P computer system 200, processors, ASIC devices, and/or graphics processing units (e.g., GPUs) of each full node computing device 210A-210F may execute network protocols which may cause each full node computing device 210A-210F to form a communicative arrangement with the other full node computing devices 210A-210F in decentralized P2P computer system 200 and thereby create decentralized P2P network 270. Furthermore, the execution of network protocols by the processors, ASIC devices, and/or GPUs of full node computing devices 210A-210F may cause full node computing devices 210A-210F to execute network functions related to blockchain 226 and maintain decentralized P2P network 270.

Lightweight node computing devices 250A and 250B may request execution of network functions related to decentralized P2P network 270. In order to request execution of network functions, such as balance sheet transaction and/or smart contract operations, processors of lightweight node computing devices 250A and 250B may execute network commands to broadcast the network functions to decentralized P2P network 270 comprising full node computing devices 210A-210F.

For example, lightweight node computing device 250A may request execution of a balance sheet transaction related to decentralized P2P network 270, which may entail a data transfer from a wallet associated with lightweight node computing device 250A to a wallet associated with lightweight node 250B. In doing so, processors of lightweight node computing device 250A may execute network commands to broadcast balance sheet transaction network function request 280 to decentralized P2P network 270. Balance sheet transaction network function request 280 may include details about the data transfer such as data type and amount, as well as a data transfer amount to full node computing devices 210A-201F of decentralized P2P network 270 for executing balance sheet transaction network function request 280. Balance sheet transaction network function request 280 may further include the public key associated with the wallet of lightweight node computing device 250B. Processors of lightweight node computing device 250A may execute digital signature algorithms to digitally sign balance sheet transaction network function request 280 with the private key associated with the wallet of lightweight node computing device 250A.

At decentralized P2P network 270, balance sheet transaction network function request 280 may be broadcasted to each of full node computing devices 210A-210F through execution of network protocols by full node computing devices 210A-210F. In order to execute balance sheet transaction network function request 280 and maintain internodal agreement as to the state of blockchain 226, processors, ASIC devices, and/or GPUs of full node computing devices 210A-210F may execute network protocols to receive broadcast of the network function through decentralized P2P network 270 and from lightweight node computing device 250A. Processors, ASIC devices, and/or GPUs of full node computing devices 210A-210F may execute hash functions to generate a digest of balance sheet transaction network function request 280. The resultant digest of balance sheet transaction network function request 280 may, in turn, be hashed with the block hash of the most immediately preceding block of blockchain 226. Processors, ASIC devices, and/or GPUs of full node computing devices 210A-210F may execute consensus algorithms to identify a numerical value (e.g., nonce) corresponding to the particular executed consensus algorithm and related to the digest that combines the digest of the balance sheet transaction network function request 280 and the block hash of the most immediately preceding block of blockchain 226.

For example, in embodiments in which the consensus algorithm is proof of work (e.g., PoW), processors, ASIC devices, and/or GPUs of full node computing devices 210A-210F may perform a plurality of hashing operations to identify a nonce that, when hashed with the digest that combines the digest of the balance sheet transaction network function request 280 and the block hash of the most immediately preceding block of blockchain 226, produces a hash of a predetermined alphanumerical format. Such a predetermined alphanumerical format may include a predetermined number of consecutive alphanumerical characters at a predetermined position within the resultant digest that combines the nonce, digest of the balance sheet transaction network function request 280, and block hash of the most immediately preceding block of blockchain 226.

In embodiments in which the consensus algorithm is proof of stake (e.g., PoS), a private key associated with one of full node computing devices 210A-210F may be pseudorandomly selected, based on balance sheet holdings associated with the public keys of full node computing devices 210A-210F, to serve as the nonce. For example, through execution of the POS consensus algorithm, full node computing devices 210A-210F are entered into a lottery in which the odds of winning are proportional to a balance sheet amount associated the wallet of each of full node computing devices 210A-210F, wherein a larger balance sheet amount corresponds to a higher probability to win the lottery. The POS consensus algorithm may cause a full node computing device from full node computing devices 210A-210F to be selected, and the public key of the wallet of the selected full node computing device to be used as the nonce.

In embodiments in which the consensus algorithm is delegated proof of stake (e.g., DpoS), a group of delegates are chosen from full node computing devices 210A-210F by each of computing devices 210A-210F, wherein full node computing devices 210A-210F are allowed to choose delegates based on balance sheet holdings associated with the respective wallets. Full node computing devices 210A-210F, however, may not choose themselves to be delegates. Once the group of delegates are chosen, the group of delegates from full node computing devices 210A-210F select a public key associated with a wallet of one of full node computing devices 210A-210F to serve as the nonce.

In embodiments in which the consensus algorithm is practical byzantine fault tolerance algorithm (e.g., PBFT), each of full node computing devices 210A-210F are associated with a particular status and/or ongoing specific information associated with the respective public key of the full node computing devices. Each of full node computing devices 210A-210F receive a message through decentralized P2P network 270 based on network protocols. Based on the received message and particular status and/or ongoing specific information, each of full node computing devices 210A-210F perform computational tasks and transmit a response to the tasks to each of the other full node computing devices 210A-210F. A public key of a wallet associated with a particular full node computing device from full node computing devices 210A-210F is selected by each of full node computing devices 210A-210F based on the response of the particular full node computing device best fulfilling criteria determined based on the network protocols.

The identification of the nonce enables processors, ASIC devices, and/or GPUs of the full node computing device from full node computing devices 210A-210F corresponding to the nonce to create a new block with a block header (e.g., block hash), which is a digest that combines the digest of balance sheet transaction network function request 280, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase balance sheet holdings associated with itself by a predetermined amount. In some arrangements, each of full node computing devices 210A-210F may receive an equal portion of the data transfer amount specified by lightweight node computing device 250A for executing balance sheet transaction network function request 280. After the new block has been added to blockchain 226, balance sheet transaction network function request 280 may be considered to be executed and the data transfer from the wallet associated with lightweight node computing device 250A to the wallet associated with lightweight node 250B may be registered.

As stated above, in some arrangements, a plurality of network function requests may be broadcasted across decentralized network P2P network 270. Processors, ASIC devices, and/or GPUs of full node computing devices 210A-210F may execute network protocols to receive broadcast of each of the network functions, including balance sheet transaction network function request 280, through decentralized P2P network 270 and from the requesting entities, including lightweight node computing device 250A. Processors, ASIC devices, and/or GPUs of full node computing devices 210A-210F may execute hash functions to generate a hash tree (e.g., Merkle tree) of the requested network functions, which culminates in a single digest (e.g., root digest, root hash, and the like) that comprises the digests of each of the requested network functions, including balance sheet transaction network function request 280. The root digest of the requested network function may, in turn, be hashed with the block hash of the most immediately preceding block of blockchain 226. Processors, ASIC devices, and/or GPUs of full node computing devices 210A-210B may execute consensus algorithms in the manner described above to identify a nonce corresponding to the particular executed consensus algorithm and related to the digest that combines the root digest of the requested network functions and the block hash of the most immediately preceding block of blockchain 226. The identification of the nonce enables processors, ASIC devices, and/or GPUs of the full node computing device from full node computing devices 210A-210F to create a new block with a block header (e.g., block hash), which is a digest that combines the root digest of the network function requests, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase a balance sheet holdings amount associated with itself by a predetermined amount. In some arrangements, each of full node computing devices 210A-210F may receive an equal portion of the data transfer amount specified by each of the network function requests. After the new block has been added to blockchain 226, each of the network functions requests, including balance sheet transaction network function request 280, may be considered to be executed and the data transfer from the private/public key associated with lightweight node computing device 250A to the private/public key associated with lightweight node 250B may be registered.

While the description provided above is made in relation to a balance sheet transaction involving lightweight node computing device 250A and lightweight node computing device 250B, it is to be understood that balance sheet transactions are not limited to lightweight node computing device 250A and lightweight node computing device 250B, but rather may be made across any of the full node computing devices and/or lightweight node computing devices in decentralized P2P system 200.

For another example, lightweight node computing device 250B may request a smart contract operation related to decentralized P2P network 270, which may facilitate a dual data transfer between a wallet associated with lightweight node computing device 250B and a wallet associated with another node in decentralized P2P network 270, such as lightweight node computing device 250A, based on fulfillment of programmatic conditions established by a smart contract. Processors of lightweight node computing device 250B may execute network commands to broadcast smart contract operation network function request 290 to decentralized P2P network 270. Smart contract operation network function request 290 may include details about the data transfer such as data type and amount, as well as a data transfer amount to full node computing devices 210A-210F of decentralized P2P network 270 for executing the smart contract corresponding to smart contract operation network function request 290. Smart contract operation network function request 290 may further include the public key associated with the smart contract. Processors of lightweight node computing device 250B may execute digital signature algorithms to digitally sign smart contract operation network function request 290 with the private key associated with the wallet of lightweight node computing device 250B.

At decentralized P2P network 270, smart contract operation network function request 290 may be broadcasted to each of full node computing devices 210A-210F through execution of network protocols by full node computing devices 210A-210F. In order to execute smart contract operation network function request 290 and maintain internodal agreement as to the state of blockchain 226, processors, ASIC devices, and/or GPUs of full node computing devices 210A-210F may execute network protocols to receive broadcast of the network function through a decentralized P2P network 270 and from lightweight node computing device 250B. Processors, ASIC devices, and/or GPUs of full node computing devices 210A-210F may execute hash functions to generate a digest of smart contract operation network function request 290. The resultant digest of smart contract operation network function request 290, in turn, may be hashed with the block hash of the most immediately preceding block of blockchain 226. Processors, ASIC devices, and/or GPUs of full node computing devices 210A-210F may execute consensus algorithms to identify a nonce corresponding to the particular executed consensus algorithm and related to the digest that combines the digest of smart contract operation network function request 290 and the block hash of the most immediately preceding block of blockchain 226.

The identification of the nonce enables processors, ASIC devices, and/or GPUs of the full node computing device from full node computing devices 210A-210F to create a new block with a block header (e.g., block hash), which is a digest that combines smart contract operation network function request 290, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may, per the network protocols, increase a balance sheet holdings amount associated with itself by a predetermined amount. In some arrangements, each of full node computing devices 210A-210F may receive an equal portion of the data transfer amount specified by lightweight node computing device 250B for executing smart contract operation network function request 290. After the new block has been added to blockchain 226, smart contract operation request 290 may be considered to be executed and the data transfer from the wallet associated with lightweight node computing device 250B to the public key associated with the smart contract may be registered.

The smart contract may be configured to hold the data transfer from the wallet associated with lightweight node computing device 250B until fulfillment of certain predetermined criteria hardcoded into the smart contract are achieved. The smart contract may be configured such that it serves as an intermediate arbiter between entities within the decentralized P2P network 270 and may specify details of a dual data transfer between entities.

For example, the smart contract corresponding to smart contract operation request 290 may be one or more algorithms and/or programs stored on a block of blockchain 226. The smart contract may be identified by one or more wallets and/or public keys within decentralized P2P network 270. Lightweight node computing device 250B may transmit smart contract operation network function request 290 to decentralized P2P network 270, which may cause execution of the corresponding smart contract that facilitates a dual data transfer between a wallet associated with lightweight node computing device 250B and a wallet associated with another node in decentralized P2P network 270, such as lightweight node computing device 250A, based on fulfillment of programmatic conditions established by the smart contract. In the processes of adding the block comprising smart contract operation request 290 to blockchain 226, each of full node computing devices 210A-210F may identify the block within blockchain 226 comprising the smart contract, associate the data transfer entailed by smart contract operation request 290 with the smart contract, and execute the one or more algorithms and/or programs of the smart contract. In this instance, given that the smart contract facilitates a dual data transfer and that data transfer has yet to be received from another node (e.g., lightweight node computing device 250A), each of full node computing devices 210A-210F may execute the smart contract without fulfillment of the programmatic conditions established by the smart contract. Accordingly, the funds transferred by lightweight node computing device 250B may remain in the smart contract until the data transfer from the other node is also associated with the smart contract.

Moving forward, lightweight node computing device 250A may also request a smart contract operation related to decentralized P2P network 270, which may conclude the dual data transfer between the wallet associated lightweight node computing device 250A and the wallet associated with lightweight node computing device 250B. Processors of lightweight node computing device 250A may execute network commands to broadcast the smart contract operation network function request to decentralized P2P network 270. The smart contract operation network function request may include details about the data transfer such as data type and amount, as well as a data transfer amount to full node computing devices 210A-210F of decentralized P2P network 270 for executing the smart contract corresponding to the smart contract operation network function request. The smart contract operation network function request may further include the public key associated with the smart contract. Processors of lightweight node computing device 250A may execute digital signature algorithms to digitally sign the smart contract operation network function request with the private key associated with the wallet of lightweight node computing device 250A.

At decentralized P2P network 270, the smart contract operation network function request may be broadcasted to each of full node computing devices 210A-210F through execution of network protocols by full node computing devices 210A-210F. In order to execute the smart contract operation network function request and maintain inter-nodal agreement as to the state of blockchain 226, processors, ASIC devices, and/or GPUs of full node computing devices 210A-210F may execute network protocols to receive broadcast of the network function through a decentralized P2P network 270 and from lightweight node computing device 250A. Processors, ASIC devices, and/or GPUs of full node computing devices 210A-210F may execute hash functions to generate a digest of the smart contract operation network function request. The resultant digest of the smart contract operation network function request, in turn, may be hashed with the block hash of the most immediately preceding block of blockchain 226. Processors, ASIC devices, and/or GPUs of full node computing devices 210A-210F may execute consensus algorithms to identify a nonce corresponding to the particular executed consensus algorithm and related to the digest that combines the digest of the smart contract operation network function request and the block hash of the most immediately preceding block of blockchain 226.

The identification of the nonce enables processors, ASIC devices, and/or GPUs of the full node computing device from full node computing devices 210A-210F to create a new block with a block header (e.g., block hash), which is a digest that combines the smart contract operation network function request, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase a balance sheet holdings amount associated with itself by a predetermined amount. In some arrangements, each of full node computing devices 210A-210F may receive an equal portion of the data transfer amount specified by lightweight node computing device 250A for executing the smart contract operation network function request. After the new block has been added to blockchain 226, the smart contract operation transaction network function request 290 may be considered to be executed and the data transfer from the wallet associated with lightweight node computing device 250A to the public key associated with the smart contract may be registered.

When the smart contract receives the data value from each of lightweight node computing device 250A and lightweight node computing device 250B, the execution of the smart contract by each of full node computing devices 210A-210F may cause transfer of the data value from lightweight node computing device 250A to lightweight node computing device 250B and the data value from lightweight node computing device 250B to lightweight node computing device 250A.

For example, lightweight node computing device 250A may transmit the smart contract operation network function request to decentralized P2P network 270, which may cause execution of the corresponding smart contract that facilitates the dual data transfer. In the process of adding the block comprising the smart contract operation request provided by lightweight node computing device 250A to blockchain 226, each of full node computing devices 210A-210F may identify the block within blockchain 226 comprising the smart contract, associate the data transfer entailed by smart contract operation request of lightweight node computing device 250A with the smart contract, and execute the one or more algorithms and/or programs of the smart contract. In this instance, given that the smart contract facilitates a dual data transfer and that data transfers have been received from lightweight node computing device 250A and lightweight node computing device 250B, each of full node computing devices 210A-210F may execute the smart contract as fulfillment of the programmatic conditions established by the smart contract has occurred. Accordingly, the funds allocated to the smart contract by each of lightweight node computing device 250A and lightweight node computing device 250B may be respectively distributed to the intended counterparty.

While the description provided above was made in relation to lightweight node computing device 250A and lightweight node computing device 250B, it should be understood that any of the full node computing devices and lightweight node computing devices in decentralized system 200 may participate in the smart contract. Furthermore, it should be understood that the smart contract may be able to fulfill dual data transfers in the manner described above across a plurality of entities entering into the smart contract. For example, a first plurality of entities may enter into the smart contract, which may hold the data values for each of the first plurality of entities until a second plurality of entities enter into the smart contract. When each of the first plurality of entities and the second plurality of entities have entered, the smart contract may perform the data transfer. Other smart contracts may be included which include algorithms, programs, and/or computer-executable instructions which cause the performance of one or more functions related to at least cryptocurrency, digital content storage and delivery, entity authentication and authorization, digital identity, marketplace creation and operation, internet of things (e.g., IoT), prediction platforms, election records, currency exchange and remittance, P2P transfers, ride sharing, trading platforms, and real estate, precious metal, and work of art registration and transference.

In comparison to the centralized computing system 100 described in regard to FIG. 1, decentralized P2P computer system 200 may provide technological advantages. For example, by distributing storage of blockchain 226 across multiple full node computing devices 210A-210F, decentralized P2P computer system 200 may not provide a single point of failure for malicious attack. In the event that any of the full node computing devices 210A-210F are compromised by a malicious attacker, decentralized P2P computer system 200 may continue to operate unabated as data storage of blockchain 226 and performance of network processes are not controlled by a singular entity such as server infrastructure 110 of centralized computing system 100.

Furthermore, by utilizing blockchain data structure 226, decentralized P2P system 200 may provide technological improvements to conventional decentralized P2P systems in regard to byzantine fault tolerance stemming from an unreliable and/or malicious full node acting in decentralized P2P network 270 to undermine the work efforts of the other nodes. For example, in coordinating action between full node computing devices 210A-210F in relation to a similar computational task (e.g., consensus algorithm), a malicious node would need to have computational power greater than the combined computational power of each of the other full node computing devices in decentralized P2P network 270 to identify the nonce and thereby be able to modify blockchain 226. As such, the likelihood that a malicious node could subvert decentralized P2P network 270 and enter falsified data into blockchain 226 is inversely proportional to the total computational power of decentralized P2P system 200. Therefore, the greater the total computational power of decentralized P2P system 200, the less likely that a malicious node could subvert decentralized P2P network 270 and undermine blockchain 226.

Figure 3A:
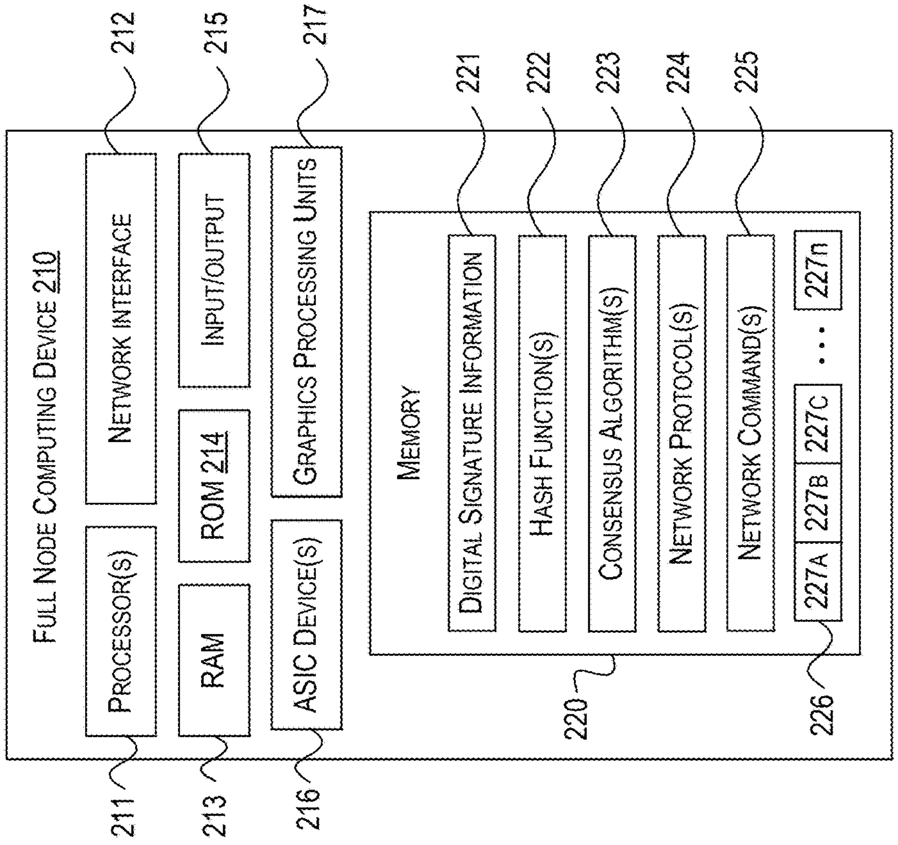
FIG. 3A depicts an illustrative example of a full node computing device that may be used in accordance with one or more illustrative aspects described herein.

FIG. 3A depicts an illustrative example of a full node computing device 210 that may be used in accordance with one or more illustrative aspects described herein. Full node computing device 210 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, full node computing device 210 may be configured to operate in a decentralized P2P network and may request execution of network functions and/or to execute requested network functions and maintain inter-nodal agreement as to the state of a blockchain of the decentralized P2P network.

Full node computing device 210 may include one or more processors 211, which control overall operation, at least in part, of full node computing device 210. Full node computing device 210 may further include random access memory (RAM) 213, read only memory (ROM) 214, network interface 212, input/output interfaces 215 (e.g., keyboard, mouse, display, printer, and the like), and memory 220. Input/output (I/O) 215 may include a variety of interface units and drives for reading, writing, displaying, and/or printing data or files. In some arrangements, full node computing device 210 may further comprise specialized hardware components such as application-specific integrated circuit (e.g., ASIC) devices 216 and/or graphics processing units (e.g., GPUs) 217. Such specialized hardware components may be used by full node computing device 210 in performing one or more of the processes involved in the execution of requested network functions and maintenance of inter-nodal agreement as to the state of a blockchain. Full node computing device 210 may further store in memory 220 operating system software for controlling overall operation of the full node computing device 210, control logic for instructing full node computing device 210 to perform aspects described herein, and other application software providing secondary, support, and/or other functionality which may or might not be used in conjunction with aspects described herein.

Memory 220 may also store data and/or computer executable instructions used in performance of one or more aspects described herein. For example, memory 220 may store digital signature information 221 and one or more hash functions 222, consensus algorithms 223, network protocols 224, and network commands 225. In some arrangements, digital signature information 221, hash functions 222, and/or network commands 225 may comprise a wallet of full node computing device 210. Memory 220 may further store blockchain 226. Each of digital signature information 221, hash functions 222, consensus algorithms 223, network protocols 224, and network commands 225 may be used and/or executed by one or more processors 211, ASIC devices 216, and/or GPUs 217 of full node computing device 210 to create and maintain a decentralized P2P network, request execution of network functions, and/or execute requested network functions and maintain inter-nodal agreement as to the state of blockchain 226.

For example, in order to create and maintain a decentralized P2P network, processors 211, ASIC devices 216, and/or GPUs 217 of full node computing device 210 may execute network protocols 225. Execution of network protocols 225 may cause full node computing device 210 to form a communicative arrangement with other full node computing devices and thereby create a decentralized P2P network. Furthermore, the execution of network protocols 225 may cause full node computing device 210 to maintain the decentralized P2P network through the performance of computational tasks related to the execution of network requests related to a blockchain such as blockchain 226. As will be described in detail below, the execution of such computational tasks (e.g., hash functions 222, consensus algorithms 223, and the like) may cause full node computing device 210 to maintain inter-nodal agreement as to the state of a blockchain with other full node computing devices comprising the decentralized P2P network.

In order to request execution of network functions, such as smart contract operations, processors 211, ASIC devices 216, and/or GPUs 217 of full node computing device 210 may execute network commands 225 to broadcast the network function to a decentralized P2P network comprising a plurality of full nodes and/or lightweight nodes. The request may be digitally signed by full node computing device 210 with usage of the private/public key information and through execution of the digital signature algorithms of digital signature information 221.

In order to execute requested network functions and maintain inter-nodal agreement as to the state of a blockchain, processors 211, ASIC devices 216, and/or GPUs 217 of full node computing device 210 may execute network protocols 224 to receive a broadcast of a requested network function through a decentralized P2P network and from a requesting entity such as a full node or lightweight node. Processors 211, ASIC devices 216, and/or GPUs 217 of full node computing device 210 may execute hash functions 222 to generate a digest of the requested network function. The resultant digest of the requested network function, in turn, may be hashed with the block hash of the most immediately preceding block of the blockchain. As will be described in further detail below, processors 211, ASIC devices 216, and/or GPUs 217 of full node computing device 210 may execute consensus algorithms 223 to identify a numerical value (e.g., nonce) corresponding to the particular executed consensus algorithm and related to the digest that combines the digest of the requested network function and the block hash of the most immediately preceding block of the blockchain. The identification of the numerical value enables processors 211, ASIC devices 216, and/or GPUs 217 of full node computing device 210 to create a new block with a block header (e.g., block hash), which is a digest that combines the digest of the requested network function, the block hash of the most immediately preceding block, and the identified nonce. Processors 211, ASIC devices 216, and/or GPUs 217 of full node computing device 210 may add the new block to the blockchain based on network protocols 224 and broadcast the new block to the other nodes in the decentralized P2P network.

As stated above, in some arrangements, a plurality of network function requests may be broadcasted across the decentralized P2P network. Processors 211, ASIC devices 216, and/or GPUs 217 of full node computing device 210 may execute network protocols 224 to receive broadcast of each of the network functions through the decentralized P2P network and from the requesting entities. Processors 211, ASIC devices 216, and/or GPUs 217 of full node computing device 210 may execute hash functions 222 to generate a hash tree (e.g., Merkle tree) of the requested network functions, which culminates in a single digest (e.g., root digest, root hash, and the like) that comprises the digests of each of the requested network functions. The root digest of the requested network function, in turn, may be hashed with the block hash of the most immediately preceding block of the blockchain. Processors 211, ASIC devices 216, and/or GPUs 217 of full node computing device 210 may execute consensus algorithms 223 to identify a numerical value (e.g., nonce) corresponding to the particular executed consensus algorithm and related to the digest that combines the root digest of the requested network functions and the block hash of the most immediately preceding block of the blockchain. The identification of the numerical value enables processors 211, ASIC devices 216, and/or GPUs 217 of full node computing device 210 to create a new block with a block header (e.g., block hash), which is a digest that combines the root digest of the requested network functions, the block hash of the most immediately preceding block, and the identified nonce. Processors 211, ASIC devices 216, and/or GPUs 217 of full node computing device 210 may add the new block to the blockchain based on network protocols 224 and broadcast the new block to the other nodes in the decentralized P2P network.

Furthermore, memory 220 of full node computing device 210 may store blockchain 226. Blockchain 226 may include a blocks 227A, 227B, 227C, . . . 227*n*, wherein block 227A represents the first block (e.g., genesis block) of blockchain 226 and block 227*n* represents the most immediate block of blockchain 226. As such, the blockchain 226, which may be a replica or copy of the blockchain of the decentralized P2P network in which full node computing device 210 operates, may be a full or complete copy of the blockchain of the decentralized P2P network. Each of the blocks within blockchain 226 may include information corresponding to the one or more network functions executed by the decentralized P2P network. As such, blockchain 226 as stored in memory 220 of full node computing device 210 may comprise the totality of network functions executed by the decentralized network.

Figure 3B:
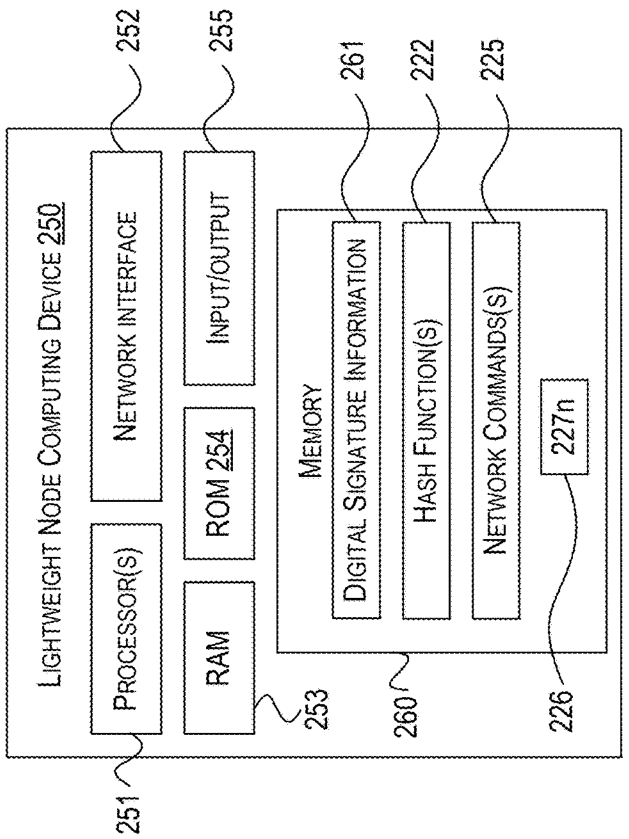
FIG. 3B depicts an illustrative example of a lightweight node computing device that may be used in accordance with one or more illustrative aspects described herein.

FIG. 3B depicts an illustrative example of a lightweight node computing device 250 that may be used in accordance with one or more illustrative aspects described herein. Lightweight node computing device 250 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, lightweight node computing device 250 may operate in a decentralized P2P network and may be configured to request execution of network functions through the decentralized P2P network. As such, lightweight node computing device 250 may be different than full node computing device 210 in that it is not configured to execute network functions and/or operate to maintain a blockchain of a decentralized P2P network. In other aspects, lightweight node computing device 250 may have substantially the same physical configuration as full node computing device 210, but configured with different programs, software, and the like.

Lightweight node computing device 250 may include one or more processors 251, which control overall operation of lightweight node computing device 250. Lightweight node computing device 250 may further include random access memory (RAM) 253, read only memory (ROM) 254, network interface 252, input/output interfaces 255 (e.g., keyboard, mouse, display, printer, and the like), and memory 260. Input/output (I/O) 255 may include a variety of interface units and drives for reading, writing, displaying, and/or printing data or files. Lightweight node computing device 250 may store in memory 260 operating system software for controlling overall operation of the lightweight node computing device 250, control logic for instructing lightweight node computing device 250 to perform aspects described herein, and other application software providing secondary, support, and/or other functionality which may or might not be used in conjunction with aspects described herein.

In comparison to full node computing device 210, lightweight node computing device 250 might not include, in some instances, specialized hardware such as ASIC devices 216 and/or GPUs 217. Such is the case because lightweight node computing device 250 might not be configured to execute network functions and/or operate to maintain a blockchain of a decentralized P2P network as is full node computing device 210. However, in certain arrangements, lightweight node computing device 250 may include such specialized hardware.

Memory 260 of lightweight node computing device 250 may also store data and/or computer executable instructions used in performance of one or more aspects described herein. For example, memory 260 may store digital signature information 261 and one or more hash functions 222 and network commands 225. In some arrangements, digital signature information 261, hash functions 222, and/or network commands 225 may comprise a wallet of lightweight node computing device 250. Each of hash functions 222 and network commands 225 stored in memory 260 of lightweight node computing device 250 may be respectively similar and/or identical to hash functions 222 network commands 225 stored in memory 220 of full node computing device 210.

In regard to the digital signature information, each of digital signature information 261 stored in memory 260 of lightweight node computing device 250 and digital signature information 221 stored in memory 220 of full node computing device 210 may comprise similar and/or identical digital signature algorithms. However, the private/public key information of digital signature information 261 stored in memory 260 of lightweight node computing device 250 may be different than that of the private/public key information of digital signature information 221 stored in memory 220 of full node computing device 210. Furthermore, the private/public key information of each node, whether full or lightweight, in a decentralized P2P computing network may be unique to that particular node. For example, a first node in a decentralized P2P computing network may have first private/public key information, a second node may have second private/public key information, a third node may have third private/public key information, and so on, wherein each of the private/public key information is unique to the particular node. As such, the private/public key information may serve as a unique identifier for the nodes in a decentralized P2P computing network.

Each of digital signature information 261, hash functions 222, and network commands 225 may be used and/or executed by one or more processors 251 of lightweight node computing device 250 to request execution of network functions in a decentralized P2P network. For example, in order to request execution of network functions, such as smart contract operations, processors 251 of lightweight node computing device 250 may execute network commands 225 to broadcast the network function to a decentralized P2P network comprising a plurality of full nodes and/or lightweight nodes. The request may be digitally signed by lightweight node computing device 250 with usage of the private/public key information and through execution of the digital signature algorithms of digital signature information 261.

Furthermore, memory 260 of lightweight node computing device 250 may store blockchain 226. Blockchain 226 stored in memory 260 of lightweight node computing device 250 may include at least block 227*n*, wherein block 227*n* represents the most immediate block of blockchain 226. As such, the blockchain 226, which may be a replica or copy of the blockchain of the decentralized P2P network in which lightweight node computing device 250 operates, may be a partial or incomplete copy of the blockchain of the decentralized P2P network. In some instances, however, blockchain 226 may include a blocks 227A, 227B, 227C, . . . 227*n*, wherein block 227A represents the first block (e.g., genesis block) of blockchain 226 and block 227*n* represents the most immediate block of blockchain 226. As such, the blockchain 226 may be a full or complete copy of the blockchain of the decentralized P2P network. Each of the blocks within blockchain 226 may include information corresponding to the one or more network functions executed by the decentralized P2P network.

Figure 4:
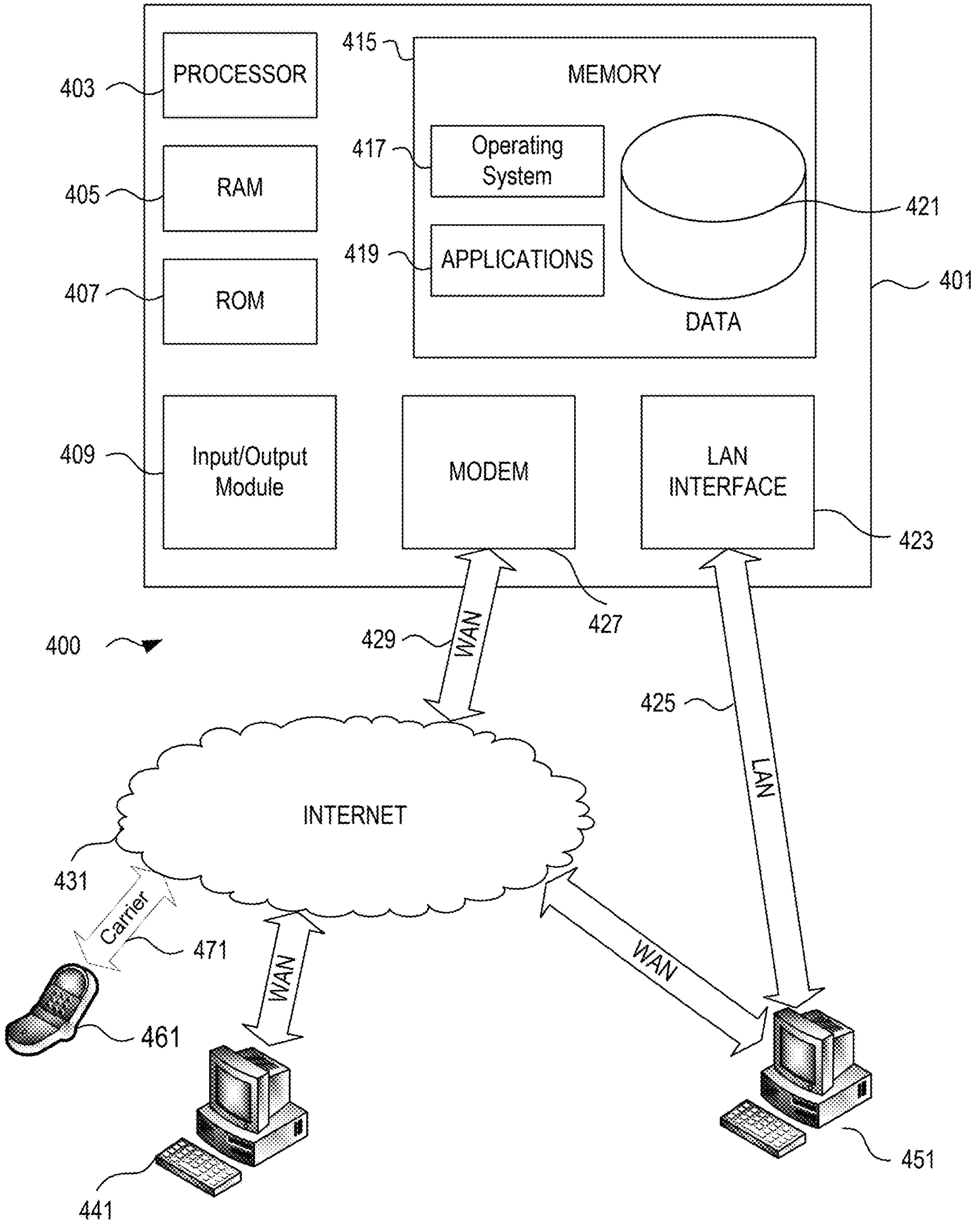
FIG. 4 depicts an illustrative example of a suitable computing system environment that may be used in accordance with one or more illustrative aspects described herein.

FIG. 4 illustrates an example of a computing system environment 400 that may be used according to one or more illustrative embodiments. The computing system environment 400 is only one example of a suitable computing environment and is not intended to suggest any limitation as to the scope of use or functionality contained in the disclosure. The computing system environment 400 should not be interpreted as having any dependency or requirement relating to any one or combination of components shown in the computing system environment 400.

The disclosure is operational with numerous other general purpose or special purpose computing system environments or configurations. Examples of well known computing systems, environments, and/or configurations that may be suitable for use with the disclosed embodiments include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 4, the computing system environment 400 may include a computing device 401 wherein the processes discussed herein may be implemented. The computing device 401 may have a processor 403 for controlling overall operation of the computing device 401 and its associated components, including random-access memory (RAM) 405, read-only memory (ROM) 407, input/output module or communications module 409, and memory 415. Computing device 401 typically includes a variety of computer readable media. Computer readable media may be any available media that may be accessed by computing device 401 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 401.

Communication media typically embodies computer readable instructions, data structures, program modules or other data in a modulated data signal such as a carrier wave or other transport mechanism and includes any information delivery media. Modulated data signal includes a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing system environment 400 may also include optical scanners (not shown). Exemplary usages include scanning and converting paper documents, e.g., correspondence, receipts to digital files.

Although not shown, RAM 405 may include one or more applications representing the application data stored in RAM 405, while the computing device is on and corresponding software applications (e.g., software tasks) are running on the computing device 401.

Communications module 409 may include a microphone, keypad, touch screen, and/or stylus through which a user of computing device 401 may provide input, and may also include one or more of a speaker for providing audio output and a video display device for providing textual, audiovisual and/or graphical output.

Software may be stored within memory 415 and/or storage to provide instructions to processor 403 for enabling computing device 401 to perform various functions. For example, memory 415 may store software used by the computing device 401, such as an operating system 417, application programs 419, and an associated database 421. Also, some or all of the computer executable instructions for computing device 401 may be embodied in hardware or firmware.

Computing device 401 may operate in a networked environment supporting connections to one or more remote computing devices, such as computing devices 441, 451, and 461. The computing devices 441, 451, and 461 may be personal computing devices or servers that include many or all of the elements described above relative to the computing device 401. Computing device 461 may be a mobile device communicating over wireless carrier channel 471.

The network connections depicted in FIG. 4 include a local area network (LAN) 425 and a wide area network (WAN) 429, but may also include other networks. When used in a LAN networking environment, computing device 401 may be connected to the LAN 425 through a network interface, such as LAN interface 423, or to an adapter in the communications module 409. When used in a WAN networking environment, the computing device 401 may include a modem in the communications module 409, a modem separate from the communications module 409, such as modem 427, or other means for establishing communications over the WAN 429, such as the Internet 431 or other type of computer network. It will be appreciated that the network connections shown are illustrative and other means of establishing a communication link between the computing devices may be used. Various well-known protocols such as TCP/IP, Ethernet, FTP, HTTP and the like may be used, and the system can be operated in a client-server or in Distributed Computing configuration to permit a user to retrieve web pages from a web-based server. Any of various conventional web browsers can be used to display and manipulate data on web pages.

Additionally, one or more application programs 419 used by the computing device 401, according to an illustrative embodiment, may include computer executable instructions for invoking user functionality related to communication including, for example, email, short message service (SMS), and voice input and speech recognition applications.

Embodiments of the disclosure may include forms of computer-readable media. Computer-readable media include any available media that can be accessed by a computing device 401. Computer-readable media may comprise storage media and communication media and in some examples may be non-transitory. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, various aspects described herein may be embodied as a method, a data processing system, or a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on a computing device 401. Such a processor may execute computer-executable instructions stored on a computer-readable medium. In an example, the systems and apparatus described herein may correspond to the computing device 401. A computer-readable medium (e.g., ROM 407) may store instructions that, when executed by the processor 403, may cause the computing device 401 to perform the functions as described herein.

Figure 5A:
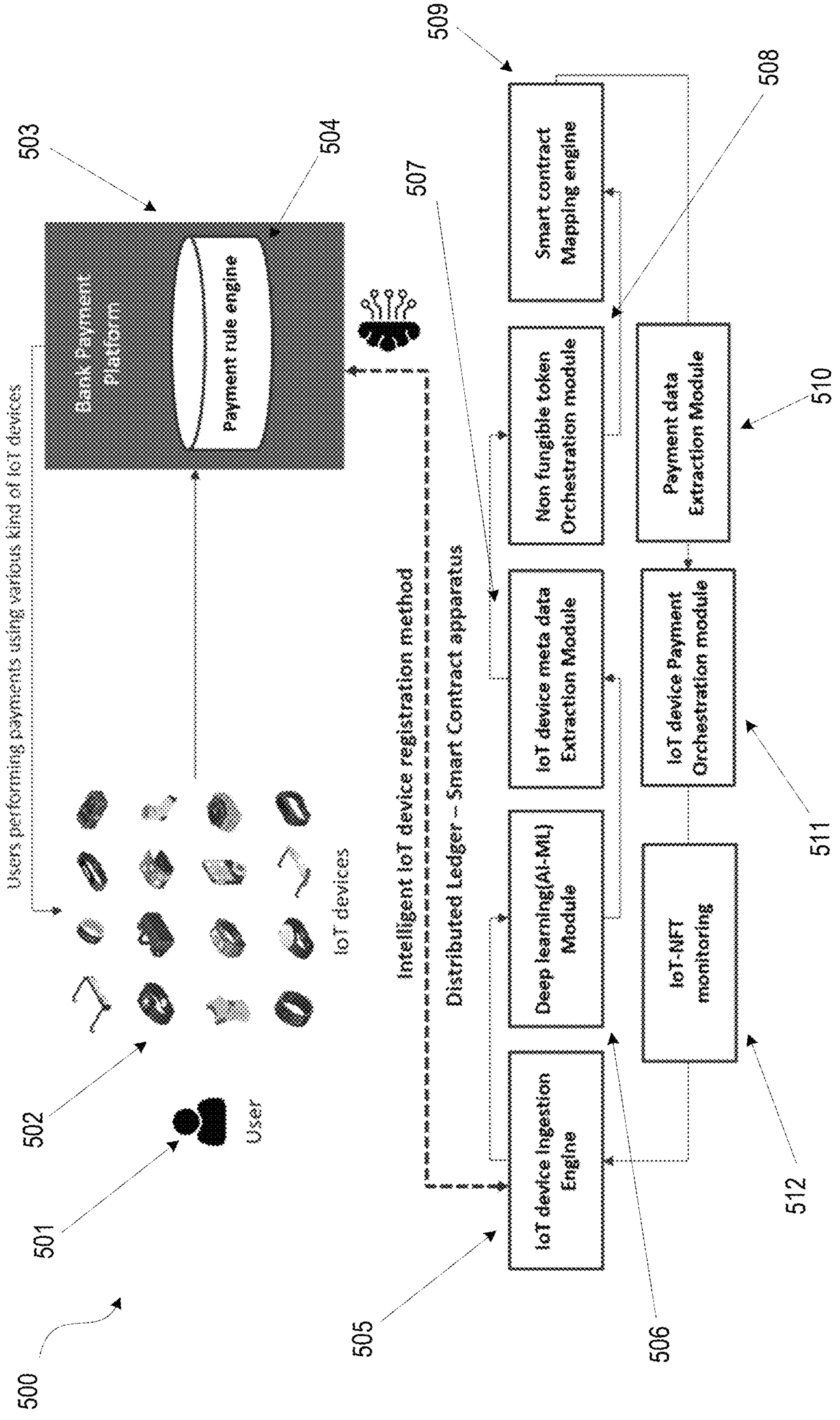
FIG. 5A depicts an illustrative example of a high-level system diagram for a blockchain based system in accordance with one or more illustrative aspects described herein.

FIG. 5A illustrates components of a system 500 that includes an intelligent apparatus that leverages NFTs to validate an IoT device and a payment transaction requested by the IoT device in order to execute a payment transaction. The system 500 also enables users to onboard an IoT device in a secure manner by leveraging NFTs. A user 501 may initiate registration of an IoT device 502 into a bank payment platform 503. The bank payment platform 503 may include a payment rule engine 504 and an IoT device ingestion engine 505. The IoT device ingestion engine 505 registers the IoT device 502 on the bank payment platform 503. The IoT device ingestion engine 505 may scan the IoT device 502 for metadata associated with the IoT device for registration purposes. The payment rule engine 504 may define payment rules and logic specific to an IoT device 502. The registration of the IoT device 502 by the IoT device ingestion engine 505 triggers a NFT generation process to pair metadata associated with an IoT device with a NFT for validation purposes. The bank payment platform 503 is in communication with an intelligent apparatus using a blockchain with various modules and engines for the NFT generation and validation processes.

The IoT device 502 may be but is not limited to a phone, tablet, smart watch, car, and/or other IoT devices.

The IoT device metadata extraction module 507 automatically mines metadata associated with the IoT device. The metadata associated with the IoT device may include technical and operational details of the IoT device 502. The metadata associated with the IoT device may include but is not limited to the manufacturer of the IoT device, the model of the IoT device, the operating system of the IoT device, the location of the IoT device (using geo-fencing or other location methods), the firmware used by the IoT device, the time (measured in seconds, minutes, hours, days, or years) the IoT device requests a payment transaction on a payment system, and/or any additional technical or temporal metadata associated with the IoT device.

The non fungible token (NFT) orchestration module 508 receives the metadata associated with the IoT device and mints or generates a first NFT pairing the metadata associated with the IoT device with the first NFT. The first NFT paired with the metadata associated with the IoT device is stored on the blockchain and tied to the metadata associated with the IoT device for validation purposes. The first NFT may be stored in the memory storage unit of a NFT repository 521.

The first NFT is managed by a smart contract generated by the smart contract mapping engine 509, which defines one or more rules for validating the IoT device 502 on the bank payment platform 503 based on the first NFT paired with the metadata associated with the IoT device. The smart contract managing the first NFT may also be stored in the memory storage unit of a NFT repository 521. The one or more rules for validating the IoT device 502 on the bank payment platform 503 based on the first NFT paired with the metadata associated with the IoT device may be determined from payment rules and logic determined by the payment rule engine 504. For example, the smart contract may define a temporal rule that payment transactions associated with the IoT device are only valid for a certain time period (measured in seconds, minutes, hours, days or years) such as one year. If the IoT device requests to execute a payment transaction outside a certain time period defined by a rule in the smart contract, the IoT device will fail validation and cause the payment transaction not to execute on the bank payment platform 503. In another example, the smart contract may define a rule for burning the first NFT and minting or generating a new first NFT when the metadata associated with the IoT device changes (i.e. an update to the IoT device changes the metadata of the IoT device's operating system or firmware). A NFT may be burned by sending the NFT to a wallet, or burn address, that is forever inaccessible on the blockchain. The burned NFT is no longer accessible by any user on the blockchain although the immutable block storing the burned NFT's data remains on the blockchain.

The first NFT paired with the metadata associated with the IoT device is used as proof of ownership of the IoT device 502 to register and validate the IoT device 502 on the bank payment platform 503. The smart contract managing the first NFT paired with the metadata associated with the IoT device may act as a digital contract between the IoT device 502 and the bank payment platform 503 for continuous validation of the IoT device 502 every time the IoT device 502 requests to execute a payment transaction. A non-fungible token is a unit of data stored on a digital ledger, called a blockchain, that certifies a digital asset to be unique and therefore not interchangeable. NFTs are created when blockchains string records of cryptographic hash, a set of characters identifying a set of data, onto previous records therefore creating a chain of identifiable data blocks. This cryptographic transaction process ensures the authentication of each digital file by providing a digital signature that is used to track NFT ownership.

When the IoT device 502 requests a payment transaction on the bank payment platform 503, a payment data extraction module 510 automatically mines the metadata associated with the payment transaction. The metadata associated with the payment transaction may include but is not limited to the time of the payment transaction, the recipient of the payment transaction, the amount in specified units (i.e. the type of currency) of the payment transaction and/or any additional spatial or temporal metadata associated with the payment transaction.

The IoT device payment orchestration module 511 receives the metadata associated with the payment transaction and mints or generates a second NFT pairing the metadata associated with the payment transaction with the second NFT. The second NFT paired with the metadata associated with the payment transaction is stored on the blockchain and tied to the metadata associated with the payment transaction for validation purposes. The second NFT may be stored in the memory storage unit of a NFT repository 521.

The second NFT is managed by a smart contract generated by the smart contract mapping engine 509, which defines one or more rules for validating the payment transaction on the bank payment platform 503 based on the second NFT paired with the metadata associated with the payment transaction. The smart contract managing the second NFT may also be stored in the memory storage unit of a NFT repository 521. The one or more rules for validating the payment transaction on the bank payment platform 503 based on the second NFT paired with the metadata associated with the payment transaction may be determined from payment rules and logic determined by the payment rule engine 504. For example, the smart contract may define a threshold rule that only payment transactions under a specified amount (i.e. 1000 units of a type of currency) are valid. If the payment transaction indicates payment units exceed a specified amount (i.e. 1000 units of a type of currency), the payment transaction will fail validation and cause the payment not to execute on the bank payment platform 503.

In another embodiment of the disclosure, the first NFT paired with the metadata associated with the IoT device and the second NFT paired with the metadata associated with the payment transaction are integrated or merged into a third NFT that is validated by the IoT-NFT monitoring module 512. In one embodiment, the NFT orchestration module 508 generates a third NFT pairing the metadata associated with the IoT device in the first NFT and the metadata associated with the payment transaction in the second NFT with a third NFT. The third NFT is stored on the blockchain and tied to the metadata associated with the IoT device and the metadata associated with the payment transaction for validation purposes. The third NFT may be stored in the memory storage unit of a NFT repository 521. The smart contract mapping engine 509 may determine and generate a smart contract managing the third NFT based on the first NFT, second NFT, and smart contracts managing the first and second NFTs. The third NFT is managed by a smart contract which defines one or more rules for validating the IoT device based on the first NFT paired with the metadata associated with the IoT device, and the payment transaction based on the second NFT paired with the metadata associated with the payment transaction in order to execute a payment transaction on the bank payment platform 503.

Using the third NFT for validation provides the most security in executing payment transactions due to validating both the IoT device and the payment transaction in order for the payment transaction to execute on the bank payment platform 503. For example, the smart contract managing the third NFT may determine the IoT device is valid. But the smart contract managing the third NFT may also determine the payment transaction is invalid. The payment transaction will fail to execute on the bank payment platform 503 due to the invalid payment transaction.

In one embodiment of the disclosure, the IoT-NFT monitoring module 512 may be in communication with a NFT repository 521 or include a NFT repository 521. The NFT repository 521 may have the first NFT, second NFT, third NFT, and the smart contracts managing the first, second, and third NFTs, stored in a memory storage unit.

In another embodiment of the disclosure, the IoT-NFT monitoring module 512 may be in communication with or include the deep learning artificial intelligence-machine learning (AI-ML) module 506. The deep learning (AI-ML) module 506 may receive the metadata associated with the IoT device and the metadata associated with the payment transaction. The deep learning (AI-ML) module 506 trains on the metadata associated with the IoT device and the metadata associated with the payment transaction to learn valid characteristics of the metadata associated with the IoT device and/or metadata associated with the payment transaction. In another embodiment, the deep learning (AI-ML) module 506 may be trained to detect anomalies based on the frequency of times the first NFT is burned and a new first NFT is minted or generated when the metadata associated with the IoT device changes (i.e. an update to the IoT device changes the metadata of the IoT device's operating system or firmware).

In one embodiment of the disclosure, the NFT orchestration module 508 handles the generating and pairing of metadata for the first, second and third NFTs, and the generation of smart contracts managing the first, second and third NFTs. In one example, the NFT orchestration module 508 may validate the IoT device and payment transaction based on the first, second, and third NFTs. In another example, the NFT orchestration module 508 may also validate the IoT device and payment transaction based on the smart contracts managing the first, second, and third NFTs.

By using blockchain nodes/distributed ledgers, information can be communicated in a secure and transparent manner based on blockchain technology described above regarding FIGS. 1, 2, and 3. Blockchain nodes/distributed ledgers have advantages over other forms of communicating data, including, e.g., advantages of immutability, security, traceability, and recovery, described further below.

Immutability refers to something that is unchanging over time, or unable to be changed. In aspects of the disclosure, once data is written to a blockchain, that data cannot be changed—not even by a system administrator or other person having a high level of access. Communicating data via blockchains, as described herein, provides immutability that is particularly advantageous from audit and compliance perspectives relevant to financial transactions. A provider of data that communicates using blockchains as disclosed herein can prove that the data has not been altered. Similarly, a recipient of data communicated via blockchains as disclosed herein can be assured that the data has not been altered.

Security is at a very high level with respect to blockchain based communications disclosed herein. By communicating sensitive information via blockchain nodes/distributed ledgers, as described herein, this information can be transferred and stored in a highly secure manner.

Traceability is another advantage of blockchain based communications disclosed herein. As examples, transaction audit logs and other traceability features of blockchain based communications disclosed herein provide support for preservation of information and transparency of transactions. As an example, if a party wants to determine any changes made to an agreement, or wants to return to a previous agreement or information, the prior data of the blockchain is readily available and traceable to do so.

Data recovery can be an advantageous feature of blockchain based communications disclosed herein. As described herein, a plurality of blockchain nodes can each maintain a copy of blockchain distributed ledgers in a network.

Decentralization, as enabled by a P2P network enables trust in the system as it does not require any third-party to mediate between multiple nodes involved in payment systems. NFTs stored in a blockchain are hard to revise and tamper. The blockchain may serve as an immutable and trusted ledger that records and validates every payment transaction in a payment system. Use of signatures may ensure that only authorized users (with a valid key) can initiate/update transactions associated with addition/updating of NFTs. Further, the inclusion of NFTs may provide support for implementing rules and functions. Encryption may be used to restrict access to data stored in blockchain (which is otherwise available to all nodes) to participants who have the privileges.

Figure 5B:
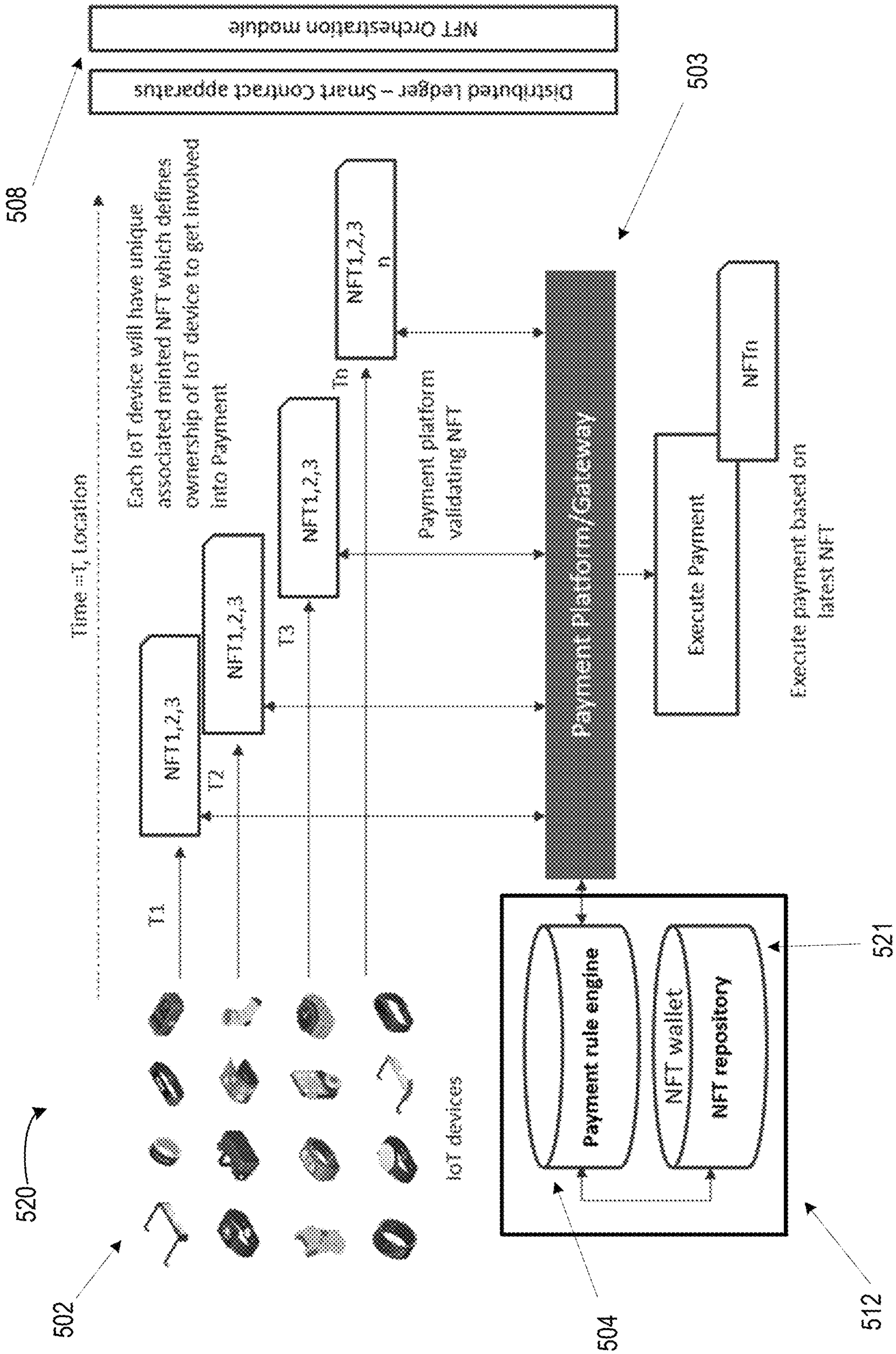
FIG. 5B depicts an illustrative example of a system in accordance with one or more illustrative aspects described herein.

FIG. 5B illustrates components of a system 520 that includes an intelligent apparatus that leverages NFTs to validate one or more IoT devices and payment transactions requested by the one or more IoT devices. The system 520 may have one or more first NFTs generated by the NFT orchestration module 508, each paired with metadata associated with an IoT device 502. The one or more first NFTs are stored in the NFT repository 521 and each are used as proof of ownership of a specific IoT device when the specific IoT device requests execution of a payment transaction on the bank payment platform 503. When the specific IoT device requests the execution of a payment transaction on the bank payment platform 503, the NFT orchestration module 508 mines metadata associated with the payment transaction to mint or generate a second NFT paired with the metadata associated with the payment transaction. The NFT orchestration module 508 also mints or generates a third NFT merging the first NFT paired with the metadata associated with the specific IoT device and the second NFT paired with the metadata associated with the payment transaction. The first NFT, second NFT, and third NFT maybe be used by the IoT-NFT monitoring module 512 alone, or in combination, to validate the IoT device and the payment transaction requested by the specific IoT device. If the payment transaction is validated, then the payment transaction will execute. If the payment transaction is not validated, then the payment transaction will fail.

In one embodiment of the disclosure, one group of first, second, and third NFTs may be used to validate a payment transaction requested by a first IoT device at time 1 (measured in seconds, minutes, hours, days or years). Another group of first, second, and third NFTs may be used to validate a payment transaction requested by a second IoT device at time 2 (measured in seconds, minutes, hours, days or years). A different group of first, second, and third NFTs may be used to validate a payment transaction requested by a third IoT device at time 3 (measured in seconds, minutes, hours, days or years).

In another embodiment of the disclosure, the IoT-NFT monitoring module 512 may include a payment rule engine 504 and a NFT repository 521.

Figure 6:
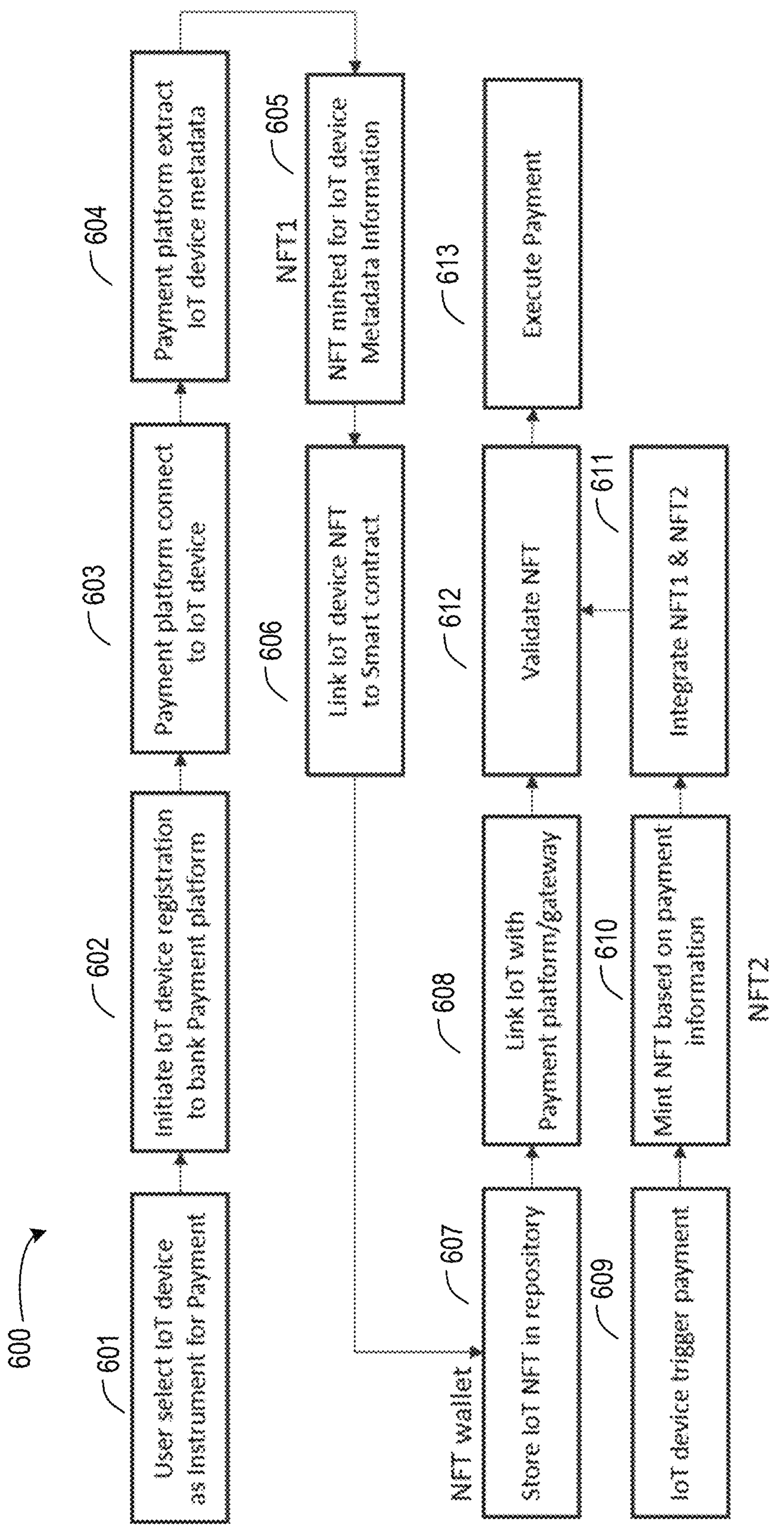
FIG. 6 depicts an example flowchart of a method used in a blockchain based system in accordance with one or more illustrative aspects described herein.

FIG. 6 refers to a flowchart mapping out the steps of the method 600 that includes using an intelligent apparatus that leverages NFTs to validate an IoT device and a payment transaction requested by the IoT device in order to execute a payment. At step 601, select, by a user, an IoT device as an instrument for payment. At step 602, initiate registration of an IoT device to a bank payment platform. At step 603, connect the bank payment platform to the IoT device.

At step 604, extract, by the bank payment platform, IoT device metadata from the IoT device. At step 605, mint a first NFT for the IoT device metadata information. The first NFT is paired with the metadata associated with the IoT device. Next, at step 606, link or bind the first NFT to a smart contract managing the first NFT. At step 607, store the first NFT in a repository. At step 608, link the first NFT with the bank payment platform.

At step 609, trigger, by the IoT device, a payment or payment transaction on the bank payment platform. At step 610, mint a second NFT based on the payment or payment transaction information. The second NFT is paired with the metadata associated with the payment transaction. The second NFT may also be linked or bound to a smart contract managing the second NFT. At step 611, integrate or merge the first NFT and the second NFT into a third NFT. The third NFT is paired with the metadata associated with the IoT device and the metadata associated with the payment transaction. The third NFT may be linked or bound to a smart contract managing the third NFT.

At step 612, validate the IoT device and payment transaction using the third NFT paired with the metadata associated with the IoT device and the metadata associated with the payment transaction. In other embodiments of the method, at step 612, validate the IoT device using the first NFT paired with the metadata associated with the IoT device and/or validate the payment transaction using the second NFT paired with the metadata associated with the payment transaction. Finally, at step 613, execute the payment or payment transaction on the bank payment platform.

Figure 7A:
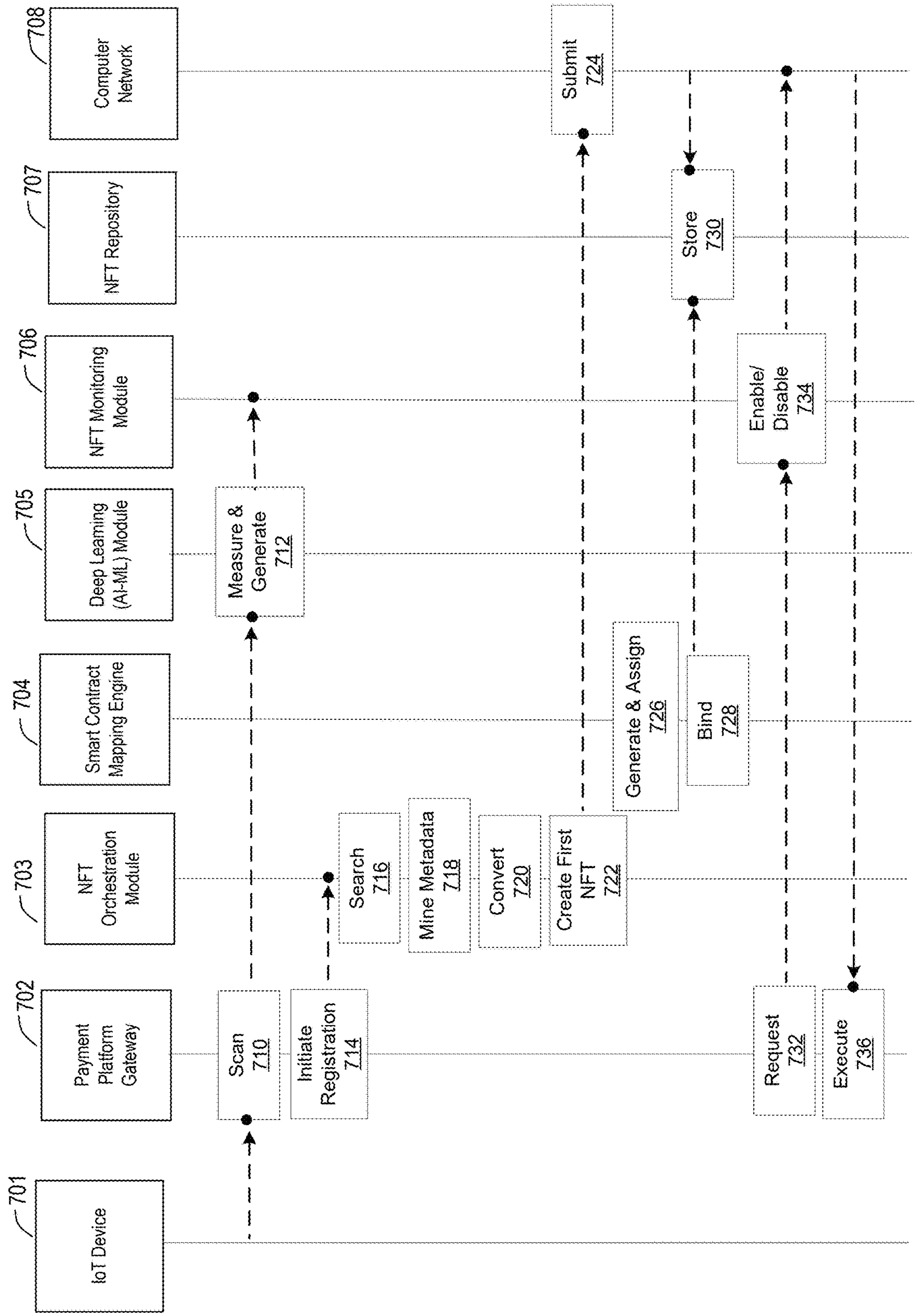
FIG. 7A depicts an example event sequence generating a NFT for validation purposes in accordance with one or more illustrative aspects described herein.

FIG. 7A illustrates components of a system that includes an intelligent apparatus that leverages NFTs to validate an IoT device in order to execute a payment transaction requested by an IoT device. Components of the system include a payment platform gateway 702, a NFT orchestration module 703, a smart contract mapping engine 704, and a NFT monitoring module 706.

In some embodiments, the payment platform gateway 702 may scan 710 for an IoT device 701 requesting a payment transaction. The payment platform gateway 702 initiates registration 714 of the identified IoT device 701 requesting a payment transaction. In one example, the payment platform gateway 702 may scan the IoT device 701 for metadata associated with the IoT device for registration purposes.

In some embodiments, the system includes a deep learning (AI-ML) module 705. The deep learning (AI-ML) module 705 may include a neural network. The deep learning (AI-ML) module 705 may receive the scanned metadata associated with the IoT device from the payment platform gateway 702. In one example, the deep learning (AI-ML) module 705 measures the metadata associated with the IoT device, analyzes the measured metadata associated with the IoT device using a neural network, and generates 712 one or more commands based on the neural network output for enabling or disabling validation of the IoT device 701 on the payment platform gateway 702.

Once the payment platform gateway 702 initiates registration of the identified IoT device 701, the NFT orchestration module 703 may search 716 the payment platform gateway 702 for the IoT device 701. The NFT orchestration module 703 generates a first NFT to certify the authenticity of the IoT device 701.

In some embodiments, generating a first NFT to certify the authenticity of the IoT device 701, may be a multi-step process. For example, the NFT orchestration module 703 may mine metadata 718 associated with the IoT device. The NFT orchestration module 703 may then convert 720 the metadata associated with the IoT device into a sequence of characters. In some examples, the sequence of characters may be a cryptographic hash generated by the NFT orchestration module 703 to authenticate the specific IoT device. This form of an unique, cryptographic hash is used to authenticate and certify the digital asset, such as an IoT device or the like.

Next, based on the unique sequence of characters, the NFT orchestration module 703 creates a first NFT 722 and submits 724 the first NFT to a blockchain network. The blockchain network, as is typically done, will process and validate the first NFT before adding it to the blockchain. The blockchain may be a digital distributed ledger, and the first NFT may be an identifiable data block stored on the blockchain to certify that the specific IoT device is authentic. The cryptographic hash or digital signature may be stored 730 in the NFT repository 707 used to track ownership of the specific IoT device corresponding to the first NFT.

The smart contract mapping engine 704 is configured to generate and assign 726 a smart contract for managing the first NFT associated with the IoT device. The smart contract mapping engine 704 generates a smart contract for an IoT device based on the first NFT associated with the metadata of the IoT device. The smart contract mapping engine 704 assigns one or more rules to the smart contract, including rules related to validating the IoT device on the payment platform gateway 702 and/or burning the first NFT and generating a new first NFT when the metadata associated with the IoT device changes (i.e. an update to the IoT device changes the metadata of the IoT device's operating system or firmware). The smart contract mapping engine 704 may bind 728 the first NFT with the smart contract for validating the IoT device on the payment platform gateway 702.

In one embodiment, the deep learning (AI-ML) module 705 measures a frequency of times the first NFT is burned and a new first NFT is generated, analyzes the measured frequency of times the first NFT is burned and the new first NFT is generated using a neural network, and generates one or more commands based on the neural network output for enabling or disabling validation of the IoT device 701 on the payment platform gateway 702.

In some embodiments, the system includes a NFT repository 707. The NFT repository 707 may store 730 the smart contract generated by the smart contract mapping engine 704 for managing the first NFT associated with the IoT device. In one example, the NFT repository 707 may bind the first NFT with the smart contract for validating the IoT device on the payment platform gateway 702. In another example, the NFT repository 707 stores a plurality of smart contracts and each of the plurality of smart contracts is bound to a NFT for validating an IoT device associated with the NFT.

The NFT monitoring module 706 acts as an intermediary between the payment platform gateway 702 and the smart contract managing the first NFT associated with the IoT device. In another example, the NFT monitoring module 706 acts as an intermediary between the payment platform gateway 702 and the NFT repository 707 storing the smart contract managing the first NFT associated with the IoT device. The IoT device 701 may request 732 to execute a payment transaction on the payment platform gateway 702. The NFT monitoring module 706 is configured to enable or disable 734 validation of the IoT device 701 requesting to execute a payment transaction on the payment platform gateway 702 with the smart contract based on rules assigned to the smart contract relating to validating the IoT device 701 on the payment platform gateway 702. The NFT monitoring module 706 may communicate with the payment platform gateway 702 by the computer network 708 enabling or disabling validation of the IoT device on the payment platform gateway 702.

The payment platform gateway 702 will execute 736 the payment transaction requested by the IoT device 701 based on the enabled or disabled validation of the IoT device 701 by the NFT monitoring module 706. For example, the payment transaction requested by the IoT device 701 will execute on the payment platform gateway 702 when the NFT monitoring module 706 enables validation of the IoT device 701. In another example, the payment transaction requested by the IoT device 701 will fail to execute on the payment platform gateway 702 when the NFT monitoring module 706 disables validation of the IoT device 701.

Figure 7B:
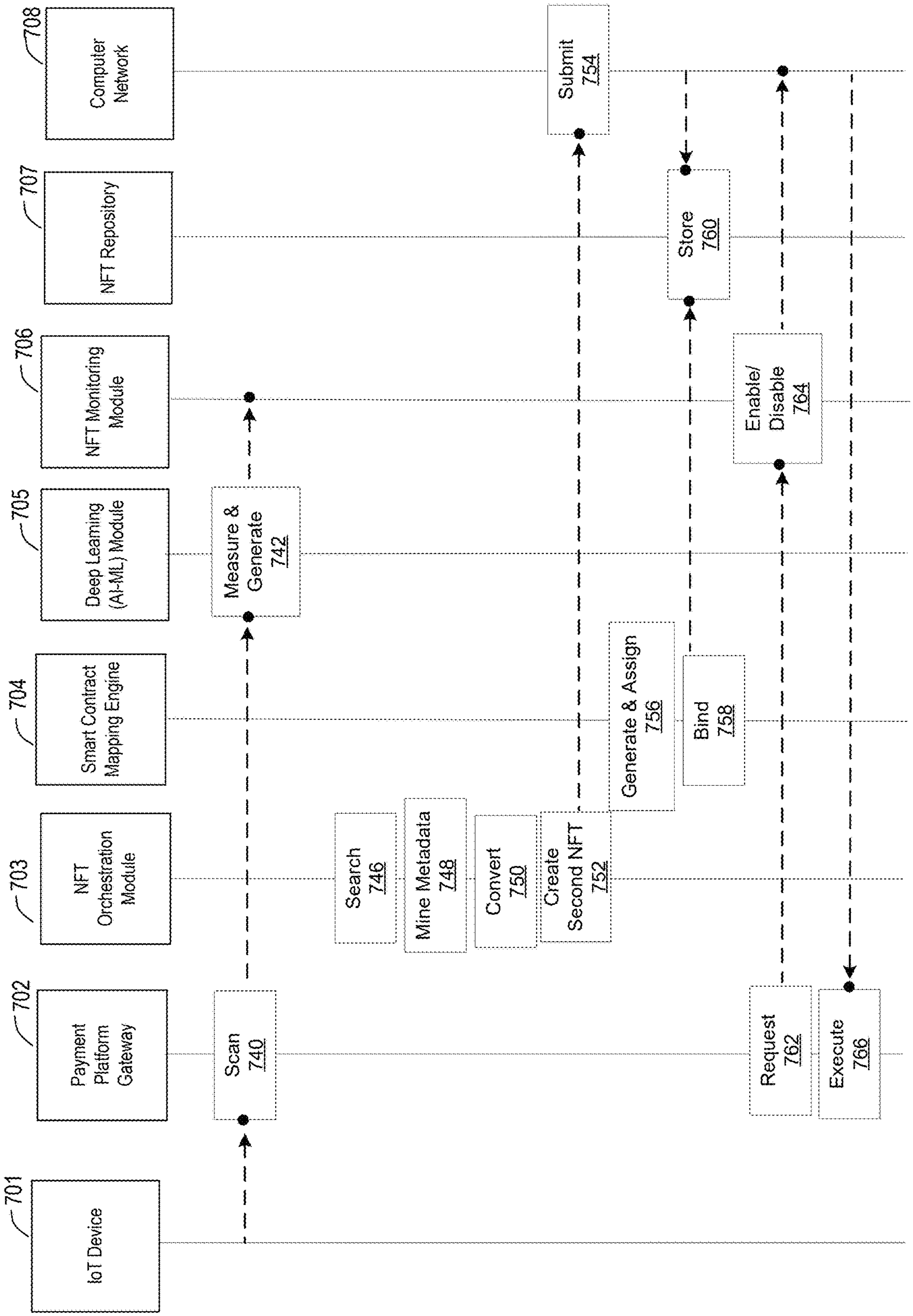
FIG. 7B depicts an example event sequence generating a NFT for validation purposes in accordance with one or more illustrative aspects described herein.

FIG. 7B illustrates components of a system that includes an intelligent apparatus that leverages NFTs to validate a payment transaction requested by an IoT device in order to execute a payment transaction. Components of the system include a payment platform gateway 702, a NFT orchestration module 703, a smart contract mapping engine 704, and a NFT monitoring module 706.

In some embodiments, the payment platform gateway 702 may scan 740 for a payment transaction requested by the IoT device 701. In one example, the payment platform gateway 702 scans the payment transaction for metadata associated with the payment transaction. The payment platform gateway 702 may initiate a validation process for the payment transaction requested by the IoT device 701 leveraging NFTs.

In some embodiments, the system includes a deep learning (AI-ML) module 705. The deep learning (AI-ML) module 705 may include a neural network. The deep learning (AI-ML) module 705 may receive the scanned metadata associated with the payment transaction from the payment platform gateway 702. In one example, the deep learning (AI-ML) module 705 measures the metadata associated with the payment transaction, analyzes the measured metadata associated with the payment transaction using a neural network, and generates 742 one or more commands based on the neural network output for enabling or disabling validation of the payment transaction on the payment platform gateway 702.

Once the payment platform gateway 702 identifies the payment transaction requested by the IoT device 701, the NFT orchestration module 703 may search 746 the payment platform gateway 702 for the payment transaction. The NFT orchestration module 703 generates a second NFT to certify the authenticity of the payment transaction.

In some embodiments, generating a second NFT to certify the authenticity of the payment transaction, may be a multi-step process. For example, the NFT orchestration module 703 may mine metadata 748 associated with the payment transaction. The NFT orchestration module 703 may then convert 750 the metadata associated with the payment transaction into a sequence of characters. In some examples, the sequence of characters may be a cryptographic hash generated by the NFT orchestration module 703 to authenticate the specific payment transaction. This form of an unique, cryptographic hash is used to authenticate and certify the digital asset, such as a payment transaction or the like.

Next, based on the unique sequence of characters, the NFT orchestration module 703 creates a second NFT 752 and submits 754 the second NFT to a blockchain network. The blockchain network, as is typically done, will process and validate the second NFT before adding it to the blockchain. The blockchain may be a digital distributed ledger, and the second NFT may be an identifiable data block stored on the blockchain to certify that the specific payment transaction is authentic. The cryptographic hash or digital signature may be stored 760 in the NFT repository 707 used to track ownership of the specific payment transaction corresponding to the second NFT.

The smart contract mapping engine 704 is configured to generate and assign 756 a smart contract for managing the second NFT associated with the payment transaction. The smart contract mapping engine 704 generates a smart contract for a payment transaction based on the second NFT associated with the metadata of the payment transaction. The smart contract mapping engine 704 assigns one or more rules to the smart contract, including rules related to validating the payment transaction on the payment platform gateway 702. The smart contract mapping engine 704 may bind 758 the second NFT with the smart contract for validating the payment transaction on the payment platform gateway 702.

In some embodiments, the system includes a NFT repository 707. The NFT repository 707 may store 760 the smart contract generated by the smart contract mapping engine 704 for managing the second NFT associated with the payment transaction. In one example, the NFT repository 707 may bind the second NFT with the smart contract for validating the payment transaction on the payment platform gateway 702. In another example, the NFT repository 707 stores a plurality of smart contracts and each of the plurality of smart contracts is bound to a NFT for validating a payment transaction associated with the NFT.

The NFT monitoring module 706 acts as an intermediary between the payment platform gateway 702 and the smart contract managing the second NFT associated with the payment transaction. In another example, the NFT monitoring module 706 acts as an intermediary between the payment platform gateway 702 and the NFT repository 707 storing the smart contract managing the second NFT associated with the payment transaction. The IoT device 701 may request 762 to execute a payment transaction on the payment platform gateway 702. The NFT monitoring module 706 is configured to enable or disable 764 validation of the payment transaction requested by the IoT device 701 on the payment platform gateway 702 with the smart contract based on rules assigned to the smart contract relating to validating the payment transaction on the payment platform gateway 702. The NFT monitoring module 706 may communicate with the payment platform gateway 702 by the computer network 708 enabling or disabling validation of the payment transaction on the payment platform gateway 702.

The payment platform gateway 702 will execute 766 the payment transaction requested by the IoT device 701 based on the enabled or disabled validation of the payment transaction by the NFT monitoring module 706. For example, the payment transaction requested by the IoT device 701 will execute on the payment platform gateway 702 when the NFT monitoring module 706 enables validation of the payment transaction. In another example, the payment transaction requested by the IoT device 701 will fail to execute on the payment platform gateway 702 when the NFT monitoring module 706 disables validation of the payment transaction.

Figure 7C:
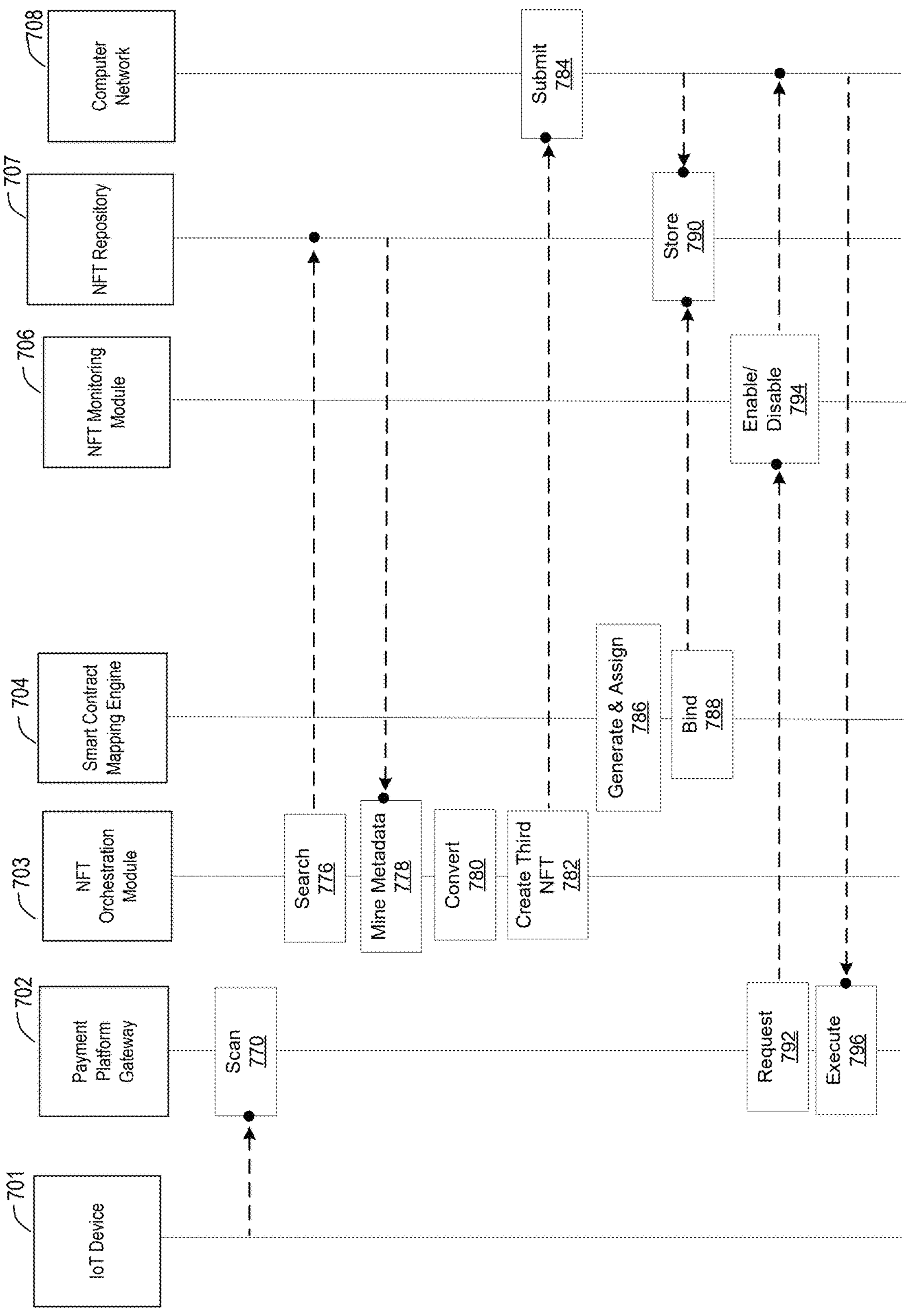
FIG. 7C depicts an example event sequence generating a NFT for validation purposes in accordance with one or more illustrative aspects described herein.

FIG. 7C illustrates components of a system that includes an intelligent apparatus that leverages NFTs to validate an IoT device and a payment transaction requested by the IoT device in order to execute a payment transaction. Components of the system include a payment platform gateway 702, a NFT orchestration module 703, a smart contract mapping engine 704, a NFT monitoring module 706, and a NFT repository 707.

In some embodiments, the payment platform gateway 702 may scan 770 for an IoT device 701 requesting a payment transaction. The payment platform gateway 702 may initiate a validation process for the requested payment transaction by the IoT device 701 leveraging multiple NFTs.

The NFT repository 707 is configured to store a first NFT associated with the IoT device and a second NFT associated the payment transaction. In one example, the first NFT associated with the IoT device is generated based on metadata associated with the IoT device and stored 730 in the NFT repository 707. The second NFT associated with the payment transaction is generated based on metadata associated with the payment transaction and stored 760 in the NFT repository 707.

In another example, the NFT repository 707 is configured to store a first smart contract managing the first NFT and a second smart contract managing the second NFT. The first smart contract is assigned one or more rules related to validating the IoT device 701 on the payment platform gateway 702. The second smart contract is assigned one or more rules related to validating the payment transaction on the payment platform gateway 702.

The NFT orchestration module 703 will search 776 the NFT repository 707 for the first NFT and the second NFT. The NFT orchestration module 703 may mine metadata 778 associated with the IoT device from the first NFT and mine metadata 778 associated with the payment transaction from the second NFT. The NFT orchestration module 703 may then convert 780 the metadata associated with the IoT device and the metadata associated with the payment transaction into a sequence of characters. In some examples, the sequence of characters may be a cryptographic hash generated by the NFT orchestration module 703 to authenticate the specific IoT device and the specific payment transaction. This form of an unique, cryptographic hash is used to authenticate and certify the digital asset, such as an IoT device, payment transaction or the like.

Next, based on the unique sequence of characters, the NFT orchestration module 703 creates a third NFT 782 and submits 784 the third NFT to a blockchain network. The blockchain network, as is typically done, will process and validate the third NFT before adding it to the blockchain. The blockchain may be a digital distributed ledger, and the third NFT may be an identifiable data block stored on the blockchain to certify that the specific IoT device and payment transaction are authentic. The cryptographic hash or digital signature may be stored 790 in the NFT repository 707 used to track ownership of the specific IoT device and payment transaction corresponding to the third NFT.

The smart contract mapping engine 704 is configured to generate and assign 786 a smart contract for managing the third NFT associated with the IoT device 701 and the payment transaction. The smart contract mapping engine 704 generates a smart contract for an IoT device and payment transaction based on the third NFT associated with the metadata of the IoT device from the first NFT and the metadata of the payment transaction from the second NFT. The smart contract mapping engine assigns one or more rules to the smart contract, including a rule related to validating the IoT device on the payment platform gateway 702 and a rule related to validating the payment transaction on the payment platform gateway 702. The smart contract mapping engine 704 may bind 788 the third NFT with the smart contract for validating the IoT device on the payment platform gateway 702.

In some embodiments, the smart contract mapping engine 704 reads the rules assigned to the first smart contract and second smart contract from the NFT repository 707. The smart contract mapping engine 704 may assign a first rule to the third smart contract managing the third NFT based on a rule assigned to the first smart contract relating to validating the IoT device on the payment platform gateway 702. The smart contract mapping engine 704 may assign a second rule to the third smart contract managing the third NFT based on a rule assigned to the second smart contract relating to validating the payment transaction on the payment platform gateway 702.

In one embodiment, the NFT repository 707 may store 790 the smart contract generated by the smart contract mapping engine 704 for managing the third NFT associated with the IoT device and payment transaction. In one example, the NFT repository 707 may bind the third NFT with the smart contract for validating the IoT device and payment transaction on the payment platform gateway 702.

The NFT monitoring module 706 acts as an intermediary between the payment platform gateway 702 and the smart contract managing the third NFT associated with the IoT device and payment transaction. In another example, the NFT monitoring module 706 acts as an intermediary between the payment platform gateway 702 and the NFT repository 707 storing the smart contract managing the third NFT associated with the IoT device and the payment transaction. The IoT device 701 may request 792 to execute a payment transaction on the payment platform gateway 702. The NFT monitoring module 706 is configured to enable or disable 794 validation of the IoT device 701 and the payment transaction on the payment platform gateway 702 with the smart contract based on rules assigned to the smart contract relating to validating the IoT device 701 and the payment transaction on the payment platform gateway 702. The NFT monitoring module 706 may communicate with the payment platform gateway 702 by the computer network 708 enabling or disabling validation of the IoT device and the payment transaction on the payment platform gateway 702.

The payment platform gateway 702 will execute 796 the payment transaction requested by the IoT device 701 based on the enabled or disabled validation of the IoT device 701 and the payment transaction by the NFT monitoring module 706. For example, the payment transaction requested by the IoT device 701 will execute on the payment platform gateway 702 when the NFT monitoring module 706 enables validation of both the IoT device 701 and the payment transaction. In another example, the payment transaction requested by the IoT device 701 will fail to execute on the payment platform gateway 702 when the NFT monitoring module 706 disables validation of the IoT device 701 and/or the payment transaction.

Although the subject matter has been described in language specific to structural features and/or methodological acts, it is to be understood that the subject matter defined in the disclosure is not necessarily limited to the specific features or acts described above. Rather, the specific features and acts described above are described as example implementations of the following disclosure. One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the disclosure will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system for generating nonfungible tokens (NFTs) involving an Internet of Things (IoT) device, the system comprising:

an Internet of Things (IoT) device;

a computing platform comprising a processor and non-transitory memory storing instructions that when executed by the processor cause the computing platform to:

search, via a NFT orchestration module, a platform gateway for a transaction requested by the IoT device;

mine, via a NFT orchestration module, metadata associated with the transaction;

convert, via a NFT orchestration module, the metadata into a sequence of characters;

create, via a NFT orchestration module, a NFT based on the sequence of characters, wherein the sequence of characters is unique;

submit, via a NFT orchestration module, the NFT to a blockchain network for addition of the NFT to the blockchain, wherein the system is configured to validate transactions requested by the IoT device based on the NFT associated with the transaction;

measure, by a deep learning module, a frequency of times an NFT is burned and a new NFT is generated when the metadata of the IoT device changes; and detect, by the deep learning module, an anomaly based upon the frequency of times the NFT is burned and the new NFT is generated when the metadata of the IoT device changes.

2. The system of claim 1, wherein the platform gateway is configured to scan for the transaction requested by the IoT device.

3. The system of claim 1, further comprising a smart contract mapping engine configured to:

generate a smart contract for the transaction based on the NFT associated with the metadata;

assign a rule to the smart contract related to validating the transaction on the platform gateway; and bind the NFT with the smart contract for validating the transaction on the platform gateway.

4. The system of claim 3, further comprising a NFT monitoring module configured to enable or disable validation of the transaction on the platform gateway with the smart contract based on the rule assigned to the smart contract relating to validating the transaction on the platform gateway.

5. The system of claim 3, further comprising a NFT repository configured to:

store the NFT; and store the smart contract bound to the NFT for validating the transaction on the platform gateway.

6. The system of claim 5, wherein the NFT repository stores a plurality of smart contracts, wherein each of the plurality of smart contracts is bound to a NFT for validating a transaction associated with the NFT.

7. The system of claim 1, wherein the metadata associated with the transaction comprises one or more of: a time of the transaction, a recipient of the transaction, and an amount in a specified currency of the transaction.

8. The system of claim 1, further comprising a deep learning module configured to:

measure metadata associated with the transaction;

analyze the measured metadata associated with the transaction using a neural network; and generate one or more commands based on a neural network output for enabling or disabling validation of the transaction on the platform gateway.

9. The system of claim 3, wherein the rule for validating the transaction on the platform gateway assigned by the smart contract mapping engine is determined from a rule engine defining rules for the transaction.

10. The system of claim 1, wherein the NFT associated with the transaction certifies a digital asset to be authentic using a cryptographic hash, and wherein the digital asset comprises the metadata, and wherein the NFT is an identifiable data block stored on a blockchain, and wherein the blockchain is a distributed ledger.

11. A method comprising:

search, by a NFT orchestration module, a platform gateway for a transaction requested by an IoT device;

mine, by the NFT orchestration module, metadata associated with the transaction;

convert, by the NFT orchestration module, the metadata into a sequence of characters;

create, by the NFT orchestration module, a NFT based on the sequence of characters, wherein the sequence of characters are unique;

submit, by the NFT orchestration module, the NFT to a blockchain network for addition of the NFT to the blockchain; and validate transactions requested by the IoT device based on the NFT associated with the transaction.

12. The method of claim 11, further comprising scanning, by the platform gateway, for the transaction requested by the IoT device.

13. The method of claim 11, further comprising:

generating, by a smart contract mapping engine, a smart contract for the transaction based on the NFT associated with the metadata;

assigning, by the smart contract mapping engine, a rule to the smart contract related to validating the transaction on the platform gateway; and bind, by the smart contract mapping engine, the NFT with the smart contract for validating the transaction on the platform gateway.

14. The method of claim 13, further comprising enabling or disabling, by a NFT monitoring module, validation of the transaction on the platform gateway with the smart contract based on the rule assigned to the smart contract relating to validating the transaction on the platform gateway.

15. One or more non-transitory computer-readable media storing instructions that, when executed by a system for generating nonfungible tokens (NFTs) involving an Internet of Things (IoT) device, cause the system comprising a processor and a NFT orchestration module to:

search, via the NFT orchestration module, a platform gateway for a transaction requested by the IoT device;

mine, via the NFT orchestration module, metadata associated with the transaction;

convert, via the NFT orchestration module, the metadata into a sequence of characters;

create a NFT based on the sequence of characters, wherein the sequence of characters is unique;

submit, via the NFT orchestration module, the NFT to a blockchain network for addition of the NFT to the blockchain;

measure, by a deep learning module, a frequency of times an NFT is burned and a new NFT is generated when the metadata of the IoT device changes; and detect, by the deep learning module, an anomaly based upon the frequency of times the NFT is burned and the new NFT is generated when the metadata of the IoT device changes.

16. The one or more non-transitory computer-readable media of claim 15, wherein the system is configured to validate transactions requested by the IoT device based on the NFT associated with the transaction.

17. The one or more non-transitory computer-readable media of claim 15, wherein the platform gateway is configured to scan for the transaction requested by the IoT device.

18. The one or more non-transitory computer-readable media of claim 15, wherein the metadata associated with the transaction comprises a time of the transaction.

19. The one or more non-transitory computer-readable media of claim 15, wherein the metadata associated with the transaction comprises a recipient of the transaction.

20. The one or more non-transitory computer-readable media of claim 15, wherein the metadata associated with the transaction comprises an amount in a specified currency of the transaction.

* * * * *